US011526459B2

(12) United States Patent
Jiang

(10) Patent No.: US 11,526,459 B2
(45) Date of Patent: Dec. 13, 2022

(54) ADAPTER, TERMINAL DEVICE AND ADAPTER SYSTEM

(71) Applicant: ZTE CORPORATION, Guangdong (CN)

(72) Inventor: Yixiang Jiang, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 539 days.

(21) Appl. No.: 16/498,779

(22) PCT Filed: Dec. 7, 2017

(86) PCT No.: PCT/CN2017/115095
§ 371 (c)(1),
(2) Date: Sep. 27, 2019

(87) PCT Pub. No.: WO2018/176901
PCT Pub. Date: Oct. 4, 2018

(65) Prior Publication Data

US 2021/0109878 A1 Apr. 15, 2021

(30) Foreign Application Priority Data

Mar. 31, 2017 (CN) ........................ 201710210635.8

(51) Int. Cl.
*G06F 13/38* (2006.01)
*H04R 5/033* (2006.01)
*H04R 5/04* (2006.01)

(52) U.S. Cl.
CPC ........... *G06F 13/382* (2013.01); *H04R 5/033* (2013.01); *H04R 5/04* (2013.01);
(Continued)

(58) Field of Classification Search
CPC ................................................ G06K 19/07749
See application file for complete search history.

(56) References Cited

U.S. PATENT DOCUMENTS 7,788,428 B2 * 8/2010 Melin .................... G09G 5/006
710/305
9,431,841 B2 * 8/2016 Inha ....................... H02J 7/342
(Continued)

FOREIGN PATENT DOCUMENTS

CN 201188444 Y 1/2009
CN 202495660 U 10/2012
(Continued)

OTHER PUBLICATIONS

International Search Report of Application No. PCT/CN2017/115095—4 pages (dated Feb. 26, 2018).
(Continued)

*Primary Examiner* — Henry Tsai
*Assistant Examiner* — Juanito C Borromeo
(74) *Attorney, Agent, or Firm* — Knobbe, Martens, Olson & Bear, LLP

(57) ABSTRACT

Provided are an adapter, a terminal device and an adapter system. The adapter includes: a universal serial bus type-C (USB-C) plug cooperatively connected to a USB-C interface of the terminal device, a USB socket cooperatively connected to a charging plug, and a headset socket cooperatively connected to a headset plug, where a first communication pin of the USB-C plug is connected to a first communication pin of the USB socket, a second communication pin of the USB-C plug is connected to a second communication pin of the USB socket, a first sound channel pin and a second sound channel pin of the USB-C plug are connected to a right sound channel signal pin and a left sound channel signal pin of the headset socket in one-to-one correspondence.

20 Claims, 14 Drawing Sheets

(52) U.S. Cl.
CPC .. *G06F 2213/0042* (2013.01); *G06F 2213/38* (2013.01); *H04R 2420/09* (2013.01)

(56) References Cited

U.S. PATENT DOCUMENTS

| | | | | |
|---|---|---|---|---|
| 2010/0020983 A1* | 1/2010 | Waites | H04R 5/04 | 381/79 |
| 2012/0246350 A1* | 9/2012 | Lee | H02J 7/0027 | 710/16 |
| 2014/0126742 A1 | 5/2014 | Eggebraaten | | |

FOREIGN PATENT DOCUMENTS

| | | | |
|---|---|---|---|
| CN | 104919388 | A | 9/2015 |
| CN | 106131732 | A | 11/2016 |
| CN | 106159611 | A | 11/2016 |
| CN | 106329254 | A | 1/2017 |
| CN | 205944658 | U | 2/2017 |
| JP | 2014-182705 | A | 9/2014 |

OTHER PUBLICATIONS

Office Action for Japanese Patent Application No. 2019-553184 dated Dec. 9, 2020.
Office Action of corresponding Chinese Patent Application No. 201710210635.8—4 pages (dated Dec. 13, 2019).

* cited by examiner

USB-C interface of a terminal device side (front)

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | VBUS | CC1 | D+ | D- | SBU1 | VBUS | RX2- | RX2+ | GND |
| | | | | | | | | | | | |
| GND | RX1+ | RX1- | VBUS | SBU2 | D- | D+ | CC2 | VBUS | TX2- | TX2+ | GND |
| B12 | B11 | B10 | B9 | B8 | B7 | B6 | B5 | B4 | B3 | B2 | B1 |

FIG. 5B

Interface of a USB-C plug of an adapter side (front)

| A12 | A11 | A10 | A9 | A8 | A7 | A6 | A5 | A4 | A3 | A2 | A1 |
|---|---|---|---|---|---|---|---|---|---|---|---|
| GND | RX2+ | RX2- | VBUS | SBU1 | D- | D+ | CC | VBUS | TX1- | TX1+ | GND |
| | | | | | | | | | | | |
| GND | TX2+ | TX2- | VBUS | VCONN | | | SBU2 | VBUS | RX1- | RX1+ | GND |
| B1 | B2 | B3 | B4 | B5 | B6 | B7 | B8 | B9 | B10 | B11 | B12 |

FIG. 5C

ADAPTER, TERMINAL DEVICE AND ADAPTER SYSTEM

CROSS-REFERENCES TO RELATED APPLICATIONS

This is a National Stage Application, filed under 35 U.S.C. 371, of International Patent Application No. PCT/CN2017/115095, filed on Dec. 7, 2017, which claims priority to a Chinese patent application No. 201710210635.8 filed on Mar. 31, 2017, disclosure of which are incorporated herein by reference in their entirety.

TECHNICAL FIELD

The present disclosure relates to the field of communications and, for example, to an adapter, a terminal device and an adapter system.

BACKGROUND

With the development of communication technology, the traditional 3.5 millimeter (mm) headset interface used in mobile terminal devices (e.g., smart phones) is gradually replaced by a universal serial bus (USB) Type-C interface (i.e., USB-C or Type-C). A charging interface, an audio and video interface and other external interfaces can be realized by one USB-C, but it cannot realize that a smart phone is charged while a headset is used for playing the audio and video.

In an analog headset adapter protocol, a solution is provided in the appendix A of the USB-C protocol. FIG. 1 is a structure diagram of a passive adapter provided in the related art. FIG. 2 is a schematic diagram of a circuit of the passive adapter shown in FIG. 1. Referring to FIGS. 1 and 2, pins A6, A7, B6 and B7 of a USB-C interface of a terminal device are only used for transmitting a left and a right sound channel signal, and a power line VBUS connected by pins A4, A9, B4 and B9 is used for transmitting a power signal. With such a charging mode, an external charging power supply provides the passive adapter with a current of about 500 milliampere (mA) at most, and charging power is generally five watts (w). Thus, a charging speed is slow, charging time is long, and a user experience effect is poor.

SUMMARY

The present disclosure provides an adapter, a terminal device and an adapter system. Through reasonable designs of the adapter and a signal transmission manner of the terminal device, the adapter and a USB-C interface of the terminal device can simultaneously transmit two paths of quick charging signals and two paths of sound channel signals, realizing that the terminal device is quickly charged while a headset is used.

The present disclosure provides an adapter. The adapter may include a USB-C plug cooperatively connected to a USB-C interface of a terminal device, a USB socket cooperatively connected to a charging plug, and a headset socket cooperatively connected to a headset plug.

A first communication pin of the USB-C plug is connected to a first communication pin of the USB socket. A second communication pin of the USB-C plug is connected to a second communication pin of the USB socket. A first sound channel pin and a second sound channel pin of the USB-C plug are connected to a right sound channel signal pin and a left sound channel signal pin of the headset socket in one-to-one correspondence.

The adapter is used for, when the adapter is inserted in the USB-C interface of the terminal device, transmitting a quick charging signal to the terminal device through the first communication pin and the second communication pin of the USB-C plug while receiving a sound channel signal from the terminal device through the first sound channel pin and the second sound channel pin of the USB-C plug.

The present disclosure further provides a terminal device. The terminal device may include a USB-C interface cooperatively connected to a USB-C plug of an adapter, a spatial separation channel switching module and a channel configuration (CC) controller module.

The USB-C interface includes four channel multiplexing pins. The spatial separation channel switching module includes a first multi-path converter and a second multi-path converter. The first multi-path converter is provided with a first switch. The second multi-path converter is provided with a second switch. A first communication signal port, a right sound channel signal port, a second communication signal port and a left sound channel signal port of the first multi-path converter are connected to a first communication signal port, a right sound channel signal port, a second communication signal port and a left sound channel signal port of the second multi-path converter in one-to-one correspondence. A first common port and a second common port of the first multi-path converter are connected to a first channel multiplexing pin and a second channel multiplexing pin of the USB-C interface in one-to-one correspondence. A first common port and a second common port of the second multi-path converter are connected to a third channel multiplexing pin and a fourth channel multiplexing pin of the USB-C interface in one-to-one correspondence.

The terminal device is used for, when the above-mentioned adapter is inserted in the USB-C interface, simultaneously transmitting two paths of quick charging signals and two paths of sound channel signals through the first channel multiplexing pin, the second channel multiplexing pin, the third channel multiplexing pin and the fourth channel multiplexing pin of the USB-C interface.

The present disclosure further provides an adapter system. The adapter system may include the above-mentioned adapter and the above-mentioned terminal device.

In the adapter, the terminal device and the adapter system provided by the present disclosure, communication pins and sound channel pins of a USB-C plug simultaneously transmit two paths of quick charging signals and two paths of sound channel signals to the terminal device, realizing that a terminal is quickly charged while a headset is used, thereby improving practicability of an adapter and a user experience effect.

BRIEF DESCRIPTION OF DRAWINGS

FIG. 5B is a schematic diagram of pin definitions of the USB-C interface of the terminal side provided by an embodiment;

FIG. 5C is a schematic diagram of pin definitions of an interface of a USB-C plug of an adapter side provided by an embodiment;

DETAILED DESCRIPTION

The steps illustrated in the flowcharts of the drawings may be performed by a computer system such as a group of computers capable of executing instructions. Although logical sequences are illustrated in the flowcharts, the illustrated or described steps may be performed in sequences different from those described herein in some cases.

In order to satisfy users' raised requirements of an appearance of a terminal device, the design of the terminal device currently adopts a solution in which a 3.5 mm headset socket is removed and merely a USB-C interface is reserved on the terminal device. The USB-C interface has a smaller volume, and can satisfy the users' requirements of the appearance of the terminal device to the maximum extent when the USB-C interface is used as an interface serving communication between the terminal device and an external device.

A passive three-terminal adapter is provided in the appendix A of the USB-C protocol document. The passive three-terminal adapter is based on an "Audio Adapter Accessory Mode" in the appendix A of "USB Type-C Specification Release 1.2".

Figure 1:
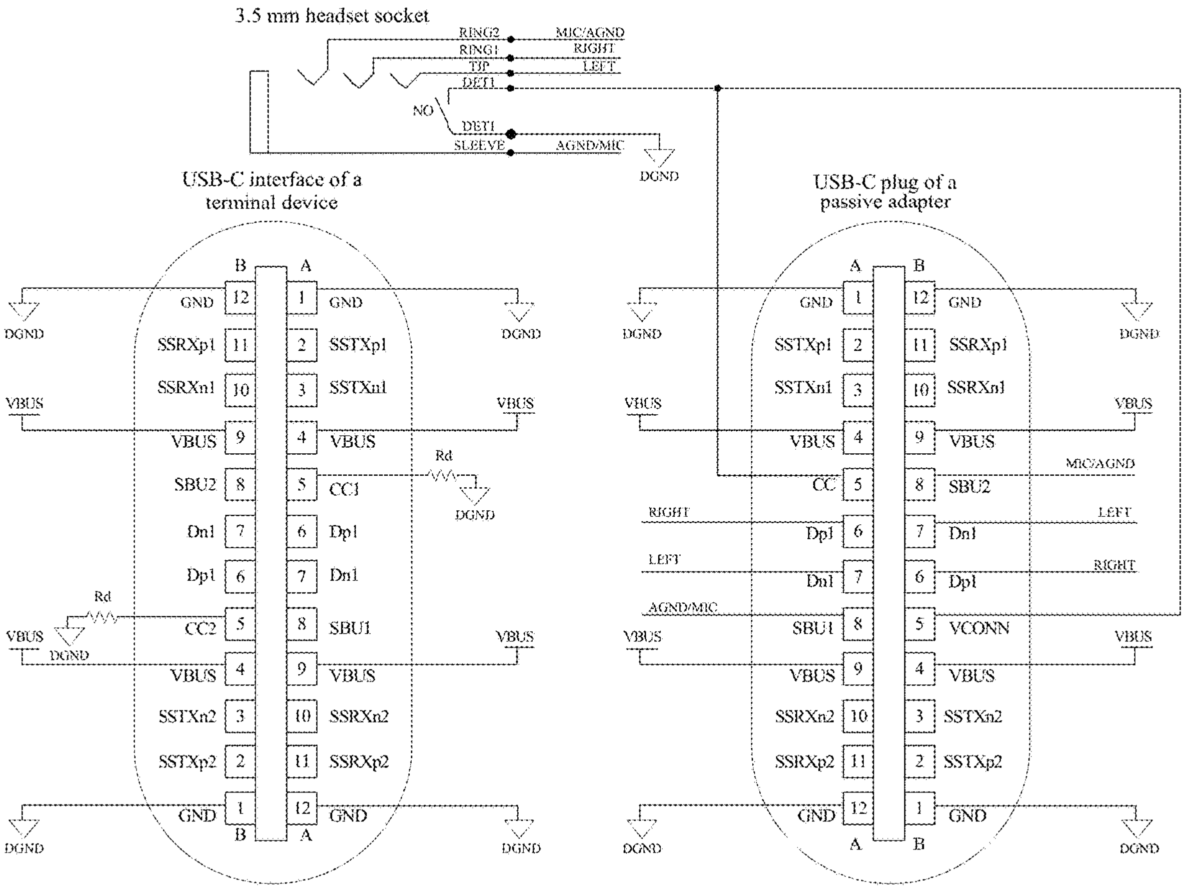
FIG. 1 is a structure diagram of a passive adapter provided in the related art.
Figure 2:
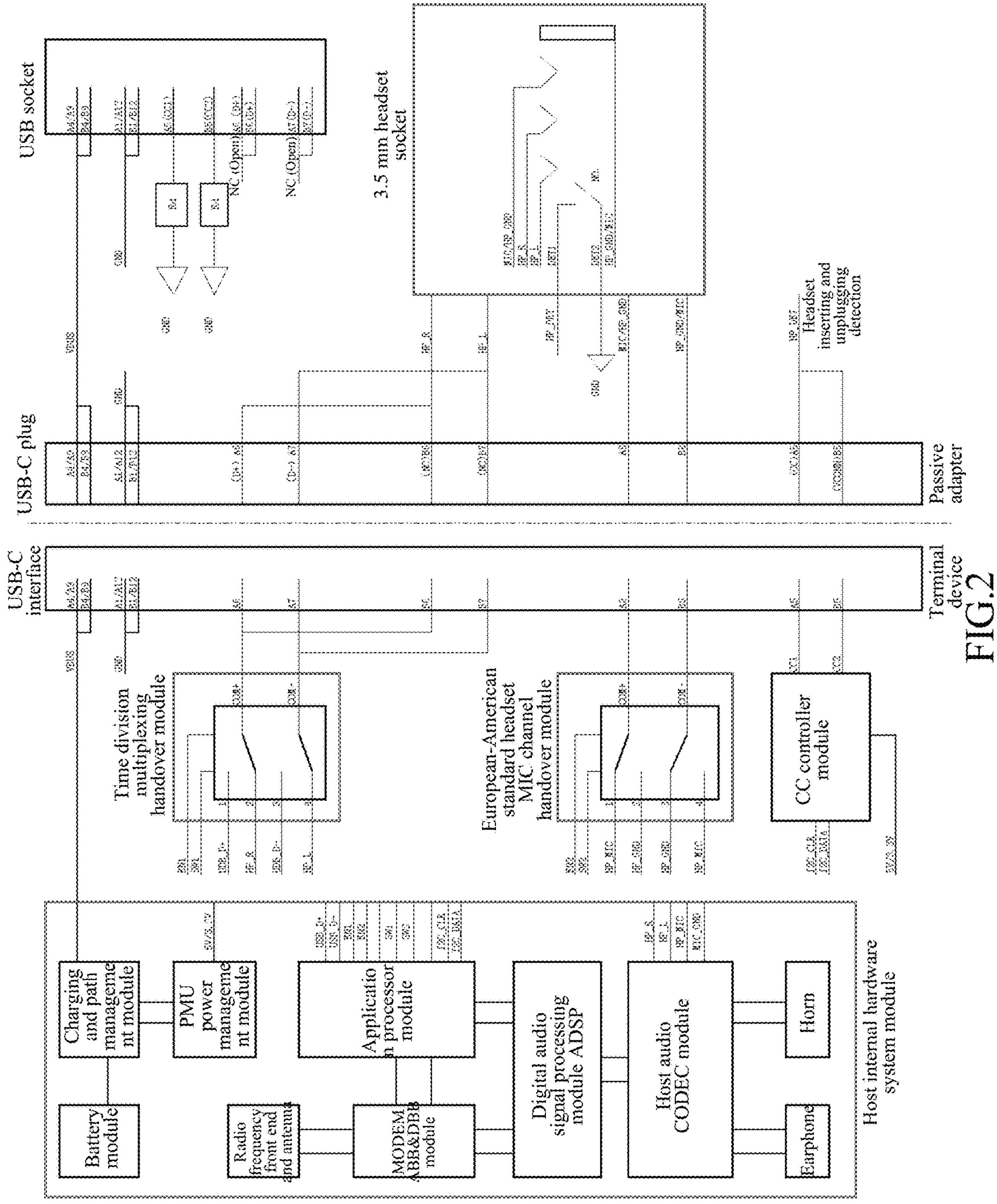
FIG. 2 is a schematic diagram of a circuit of the passive adapter shown in FIG. 1.

Referring to FIGS. 1 and 2, the USB-C interface of a terminal device side may include: a time division multiplexing switching module, which is configured to perform a selection handover function of left and right sound channel signals and USB D+/D− signals; a European-American standard microphone (MIC) channel switching module, which is configured to perform a channel handover function of signals HP_MIC and HP_GNP, and perform insertion and reverse insertion and European-American standard headset adaption; and a CC controller, which is configured to perform identification of a type of an external device and a function of identifying insertion and reverse insertion.

When the CC controller detects that pins CC1 and CC2 both are connected to resistances whose resistance values are less than Ra (Ra may be 800 to 1200 ohms), it can be identified that a passive analog headset adapter is inserted. At this time, the CC controller will, through an Inter-Integrated Circuit (I2C), notify an application processor module that the passive analog headset adapter is inserted into the USB-C interface. The application processor module controls the above channel switching modules to be used as channel routes, and sets the USB-C interface to be in a passive analog headset mode, thereby switching on an analog headset channel.

A passive adapter may further include a USB-C plug cooperatively connected to a USB-C interface of a terminal device side and a USB socket cooperatively connected to a charging plug. The pins CC1 and CC2 of the USB plug of the passive adapter are grounded through a resistance Rd of about 5.6 kilohm respectively. At this point, for an external charging power supply, the passive adapter is a USB device, and the external charging power supply can provide the passive adapter with about a current of 500 mA at most.

It can be seen from FIGS. 1 and 2 that left and right sound channel signals of a headset in the passive adapter occupy four pins A6, A7, B6 and B7, and a power signal is transmitted through a power line (VBUS) connected to pins A4, A9, B4 and B9 of the USB-C plug of a passive adapter side. Such a charging manner can support merely 500 mA charging (the charging power is generally 5 w), with a slow charging speed, a charging time is long and poor user experience.

The terminal device in this embodiment is referred to as a terminal device having a USB-C interface, such as a smart phone, a tablet computer or a personal digital assistance (PDA), and correspondingly, the adapter in this embodiment may be provided with a USB-C plug adapted to the above-mentioned USB-C interface. The embodiments may be combined with each other, and identical or similar concepts or processes may not be repeated in some embodiments.

Figure 3:
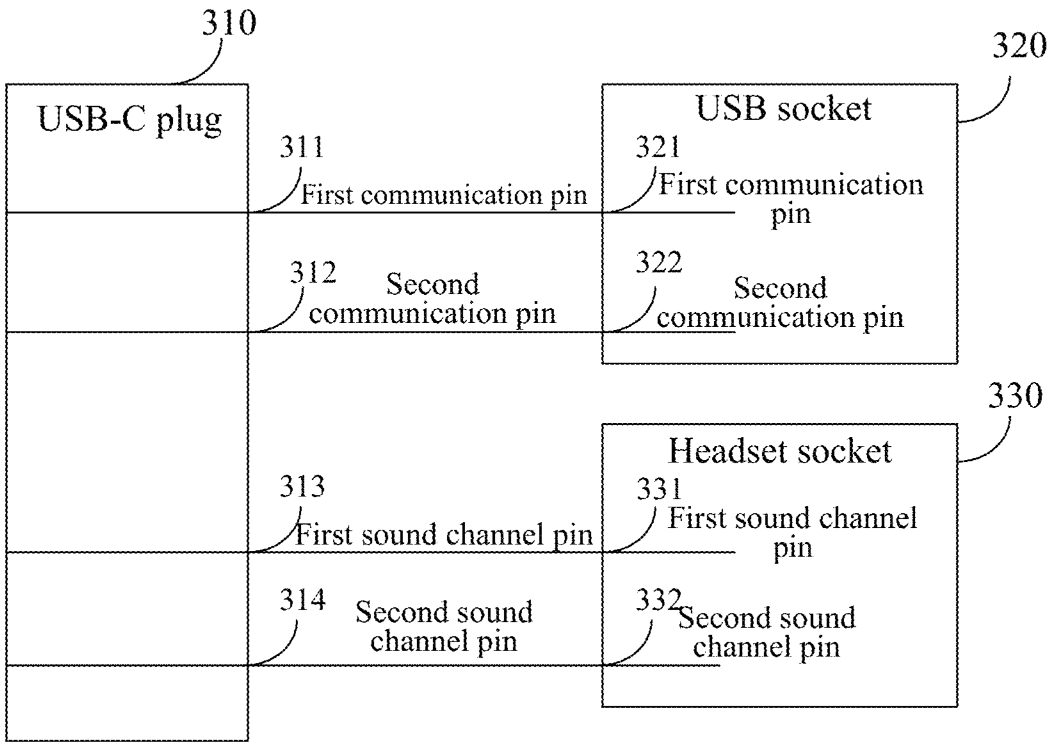
FIG. 3 is a structural diagram of an adapter provided by an embodiment.

FIG. 3 is a structural diagram of an adapter provided by this embodiment. The adapter provided by this embodiment can realize the use of the headset while the quick charging is performed. As shown in FIG. 3, the adapter may include a USB-C plug 310 cooperatively connected to a USB-C interface of a terminal device, a USB socket 320 cooperatively connected to a charging plug, and a headset socket 330 cooperatively connected to a headset plug. The headset socket may be a 3.5 mm headset socket.

The USB-C plug 310 may include communication pins and sound channel pins. The USB socket 320 may include communication pins. A first communication pin 311 of the USB-C plug 310 is connected to a first communication pin 321 of the USB socket 320. A second communication pin 312 of the USB-C plug 310 is connected to a second communication pin 322 of the USB socket 320. A first sound channel pin 313 of the USB-C plug 310 is connected to a first sound channel pin 331 of the headset socket 330. A second sound channel pin 314 of the USB-C plug 310 is connected to a second sound channel pin 332 of the headset socket 330.

The first sound channel pin 331 may be a right sound channel signal pin, and the second sound channel pin 332 may be a left sound channel signal pin. Through the above connection manner, the adapter provided by this embodiment can be used for, when the adapter is inserted in the USB-C interface of the terminal device, simultaneously transmitting two paths of quick charging signals and two paths of sound channel signals to the terminal device through communication pins and sound channel pins of the USB-C plug 310. In this embodiment, during the quick charging through the first communication pin and the second communication pin, the charging power is generally greater than 10 w, such as charging power of 12 w to 25 w, which greatly improves the charging speed and reduces the charging time. In addition, in this embodiment, the USB socket in the adapter is a USB socket that can transmit USB D+/D− signals. For example, the USB D+/D− signals are transmitted through the first communication pin and the second communication pin of the USB socket. This USB socket can adapt, for example, a USB-C socket, a USB-A socket, a Mirco USB socket and the like.

Through the adapter in this embodiment, USB D+/D− signals that direct current (DC) direct charging and Qualcomm (QC) quick charging generally require can connect to related ports of the USB D+/D− signals of the USB-C interface in the terminal device, which can complete charging handshake communication between a charging adapter and the terminal device, thereby implementing the QC quick charging or other quick charging solutions using USB D+/D− signals (e.g., the DC direct charging).

Figure 4:
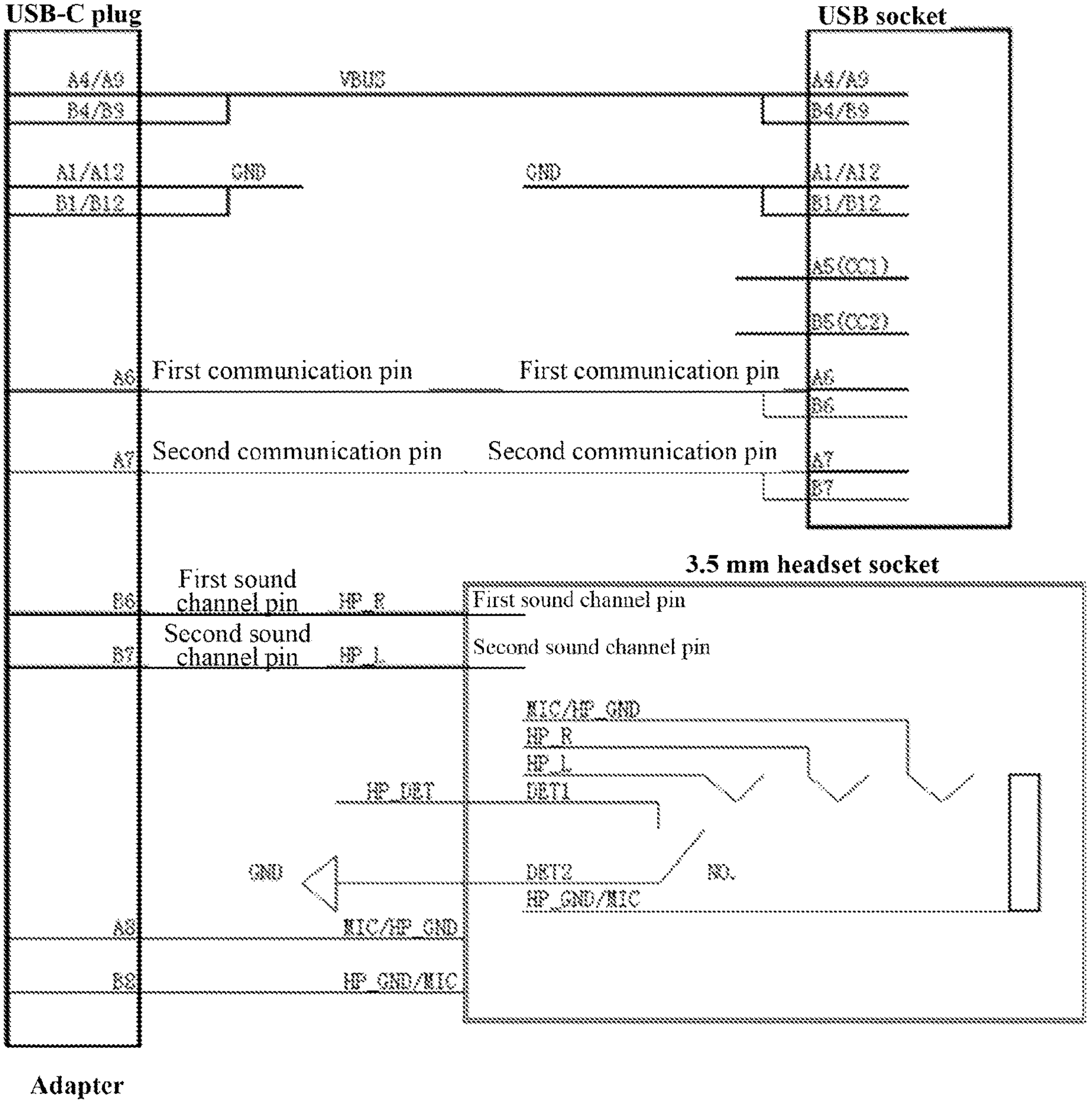
FIG. 4 is a structural diagram of another adapter provided by an embodiment.

Optionally, FIG. 4 is a structural diagram of another adapter provided by this embodiment. In FIG. 4, the first communication pin, the second communication pin, the first sound channel pin and the second sound channel pin of the USB-C plug can be set to correspond to pins A6, A7, B6 and B7 respectively. The first communication pin and the second communication pin of the USB socket can correspond to a USB_D+ signal pin and a USB_D− signal pin respectively. At this time, the pin A6 of the USB-C plug is connected to the USB_D+ signal pin of the USB socket, the pin A7 of the USB-C plug is connected to the USB_D− signal pin of the USB socket, the pin B6 of the USB-C plug is connected to the right sound channel signal pin of the headset socket, and the pin B7 of the USB-C plug is connected to the left sound channel signal pin of the headset socket. Pins of the USB-C plug and the USB socket may further be set in other forms. In the adapter shown in FIG. 4, pins A4, A9, B4 and B9 of the USB-C plug may be connected to pins A4, A9, B4 and B9 of the USB socket through the USB voltage line (VBUS), for providing 500 mA charging for the terminal device. Pins A1, A12, B1 and B12 of the USB-C plug and pins A1, A12, B1 and B12 of the USB socket are all grounded.

The object of this embodiment is to design an adapter that can support the quick charging and allow using the headset while the quick charging is performed. Since currently the mainstream quick charging solutions are the DC direct charging and QC quick charging, in these two solutions, a charger communicates and interworks with the terminal device through D+/D− of a USB 2.0 bus. According to the analog headset adapter solution in the appendix A of the USB-C protocol, as shown in FIGS. 1 and 2, channels that left and right sound channel signals of the analog headset pass through are D+/D− channels, headset left and right sound channel signals and the USB_D+/D− signals time-division multiplex pins A6, B6, A7 and B7 of the USB-C interface, and the two groups of signals cannot simultaneously pass through the USB-C interface. It can be seen that four signals, i.e., a left sound channel signal HP_L, a right sound channel signal HP_R, a USB_D+ signal and a USB_D− signal, occupy four pins A6, A7, B6 and B7. The solution of this embodiment is as follows: each of above signals occupies a pin respectively, which can make the left sound channel signal HP_L, the right sound channel signal HP_R, the USB_D+ signal and the USB_D− signal work simultaneously, and realize the use of the headset while the quick charging is performed.

Figure 5A:
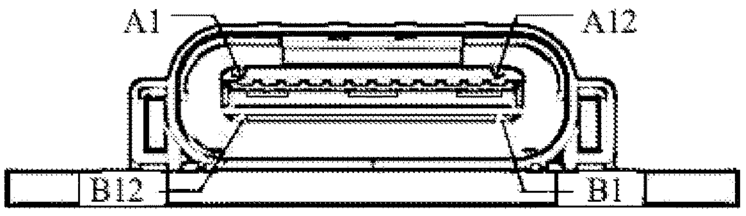
FIG. 5A is a structural diagram of a USB-C interface of a terminal side provided by an embodiment.

According to the USB-C standard protocol, on the terminal device side, the USB_D+ signal of the USB-C interface is defined in pins A6 and B6, and the USB_D− signal is defined in pins A7 and B7; and on the adapter side, the USB_D+ signal of the USB-C plug is defined in the pin A6, the USB_D− signal is defined in the pin A7, and pins B6 and B7 are open and undefined. FIG. 5A is a structural diagram of a USB-C interface set on a terminal (e.g., a cellphone), FIG. 5B is a schematic diagram of pin definitions of the USB-C interface, and FIG. 5C is a schematic diagram of pin definitions of the USB-C plug. It can be seen from FIGS. 5A and 5C that when the USB-C plug is positively inserted, what the USB_D+ signal pin and the USB_D− signal pin (i.e., pins A6 and A7) of the USB-C plug contact are pins A6 and A7 of the USB-C interface, and when the USB-C plug is reversely inserted, what the USB_D+ signal pin and the USB_D− signal pin (i.e., pins A6 and A7) of the USB-C plug contact are pins B6, B7 of the USB-C interface. Therefore, when the USB-C plug is positively inserted, USB_D+/USB_D− signals of the USB-C interface occupy merely pins A6 and A7, and at this time, pins B6, B7 are open; and when the USB-C plug is reversely inserted, USB_D+/USB_D− signals of the USB-C interface occupy merely pins B6, B7, and at this time, pins A6 and A7 are open. That is, when the USB-C plug is positively or reversely inserted, two pins of the USB-C interface terminal are open. Therefore, the two open pins of the USB-C interface can be used for delivering left and right sound channel signals, that is, when the USB-C plug is positively inserted, open pins B6, B7 of the USB-C interface are used for delivering left and right sound channel signals, and when the USB-C plug is reversely inserted, open pins A6 and A7 of the USB-C interface are used for delivering left and right sound channel signals.

In this embodiment, two open pins (e.g., pins B6 and B7) of the USB-C plug of the adapter can be used as pins transmitting the right sound channel signal HP_R and the left sound channel signal HP_L. That is, the pin B6 of the USB-C plug is connected to the right sound channel signal pin of the headset socket, the pin B7 of the USB-C plug is connected to the left sound channel signal pin of the headset socket. Pins A6 and A7 of the USB-C plug are used as pins transmitting the USB_D+ signal and the USB_D− signal. That is, the pin A6 of the USB-C plug is connected to the USB_D+ signal pin of the USB socket, and the pin A7 of the USB-C plug is connected to the USB_D− signal pin of the USB socket. In such a way, when the adapter is positively inserted in the USB-C interface of the terminal device, pins A6, A7, B6 and B7 of the USB-C interface can deliver the USB_D+ signal, USB_D− signal, HP_R signal and HP_L signal in one-to-one correspondence, and when the adapter is reversely inserted in the USB-C interface of the terminal device, pins A6, A7, B6 and B7 of the USB-C interface can deliver the HP_R signal, the HP_L signal, the USB_D+ signal and the USB_D− signal in one-to-one correspondence. For example, that pins A6, A7, B6 and B7 of the USB-C interface can deliver the USB_D+ signal, the USB_D− signal, the HP_R signal and the HP_L signal in one-to-one correspondence is referred to that the pin A6 of the USB-C interface delivers the USB_D+ signal, the pin A7 delivers the USB_D− signal, the pin B6 delivers the HP_R signal, and the pin B7 delivers the HP_L signal, and the description of all the one-to-one correspondence in this embodiment is the same as the meaning of the one-to-one correspondence herein.

In the USB-C interface of the terminal device, a set of positive and reverse insertion channel switching circuits that are adapted to the above USB-C plug can be designed, signals transmitted to pins A6, A7, B6 and B7 of the USB-C interface are used as signal routings according to paths that signals pass through when the USB-C plug is positively and reversely inserted, and the USB_D+ signal, the USB_D− signal, the HP_R signal and the HP_L signal are respectively sent to corresponding signal pins in a hardware system module of the terminal device. In such a way, the simultaneous delivery of the USB_D+ and USB_D− signals and the analog headset left channel signal HP_L and the analog headset right channel signal HP_R is realized, that is, a users' demand of using the headset while performing quick charging can be satisfied.

It can be seen by comparing FIGS. 2, 3 and 4 that in addition to the USB-C cable controller it has, the adapter in this embodiment has following differences in terms of a connection relationship of pins: (1) the resistor Rd connected to the pins CC1 and CC2 (i.e., pins A5 and B5) of the USB socket is deleted; (2) short lines between pins A6 and B6 of the USB-C plug and between pins A7 and B7 of the USB-C plug are deleted; (3) pins A6 and A7 of the USB-C plug are directly connected to the USB_D+ signal pin and the USB_D− signal pin of the USB socket; and (4) pins B6 and B7 of the USB-C plug are directly connected to the left sound channel signal pin (e.g., HP_R pin) and the left sound channel signal pin (e.g., HP_L pin) of the headset socket. In this embodiment, in addition to above differences, other pin connection relationships of the USB-C interface, the USB socket and the headset socket are similar to the pin connection relationship of the passive adapter shown in FIG. 2, which is not repeated herein.

In order to overcome the defect in which a headset adapter having a charging function cannot simultaneously support the quick charging and the headset use, in this embodiment, a passive adapter solution in which the headset right sound channel signal HP_R, the left sound channel signal HP_L, the USB_D+ signal and the USB_D− signal time-division multiplex pins A6, A7, B6 and B7 is improved, which realizes the spatial separation of the USB channel and the analog headset channel and enables the right sound channel signal HP_R, left sound channel signal HP_L, the USB_D+ signal, and the USB_D− signals to be simultaneously transmitted to the USB-C interface of the terminal device. Therefore, the users' demand of using the headset while performing quick charging is supported.

In the adapter provided by this embodiment, the USB-C plug includes communication pins and sound channel pins, the socket of the adapter adopts a USB socket having communication pins, the first communication pin of the USB-C plug is connected to the first communication pin of the USB socket, the second communication pin of the USB-C plug is connected to the second communication pin of the USB socket, two sound channel pins of the USB-C plug are connected to the right sound channel signal pin and the left sound channel signal pin of the headset socket in one-to-one correspondence, and two paths of quick charging signals and two paths of sound channel signals are simultaneously transmitted to the terminal device through communication pins and sound channel pins of the USB-C plug, realizing that the terminal is quickly charged while the headset is used, thereby improving practicability of the adapter and a user experience effect.

In this embodiment, on the basis of the design of the pin connection of the adapter, the terminal device may be provided with a channel switching module that is adapted to the adapter, and when the adapter is inserted in the USB-C interface of the terminal device, following functions can be realized.

When the adapter is positively inserted in the USB-C interface of the terminal device, the first communication pin (e.g., A6 in FIG. 4), the second communication pin (e.g., A7 in FIG. 4), the first sound channel signal pin (e.g., B6 in FIG. 4) and the second sound channel signal pin (e.g., B7 in FIG. 4) of the USB-C plug are connected to four channel multiplexing pins (e.g., pins A6, A7, B6 and B7 of the USB interface in the terminal device) of the USB-C interface of the terminal device in one-to-one correspondence.

When the adapter is reversely inserted in the USB-C interface of the terminal device, the first sound channel signal pin (e.g., B6 in FIG. 4), the second sound channel signal pin (e.g., B7 in FIG. 4), the first communication pin (e.g., A6 in FIG. 4) and the second communication pin (e.g., A7 in FIG. 4) of the USB-C plug are connected to the four channel multiplexing pins (e.g., pins B6, B7, A6 and A7 of the USB interface in the terminal device) of the USB-C interface of the terminal device in one-to-one correspondence.

That is, in conjunction with the channel switching module provided in the terminal device, the USB_D+ signal, the USB_D− signal, the right sound channel signal and the left sound channel signal inputted by the adapter from the USB-C plug can be connected to different pins of the USB-C interface of the terminal device, and according to differences between the positive insertion and the reverse insertion, the above signals are connected to different pins of the USB-C interface of the terminal device.

As shown in FIG. 4, in the adapter provided by this embodiment, the first communication pin (i.e., the USB_D+ signal pin) of the USB socket may include pins A6 and B6, the second communication pin (i.e., the USB_D− signal pin) of the USB socket may include pins A7 and B7 of the USB socket, the pin A6 and the pin B6 may be shorted, and the pin A7 and the pin B7 may also be directly shorted. In this embodiment, through a design manner of pins of the USB-C plug, the quick charging function of the adapter is realized: the first communication pin and the second communication pin (e.g., pins A6 and A7) of the USB-C plug transmit two paths of quick charging signals (i.e., USB_D+ and USB_D− signals) inputted through the USB plug in one-to-one correspondence, that is, the first communication pin and the second communication pin respectively correspond to pins A6 and B6 and pins A7 and B7 of a charging port USB socket. In order to simplify positive and reverse insertion adaption, A6 can be shorted with B6, and A7 can be shorted with B7. Therefore, as long as the USB_D+/USB_D− quick charging solution is used, a physical connection can be established with an interior of the terminal device.

Figure 6:
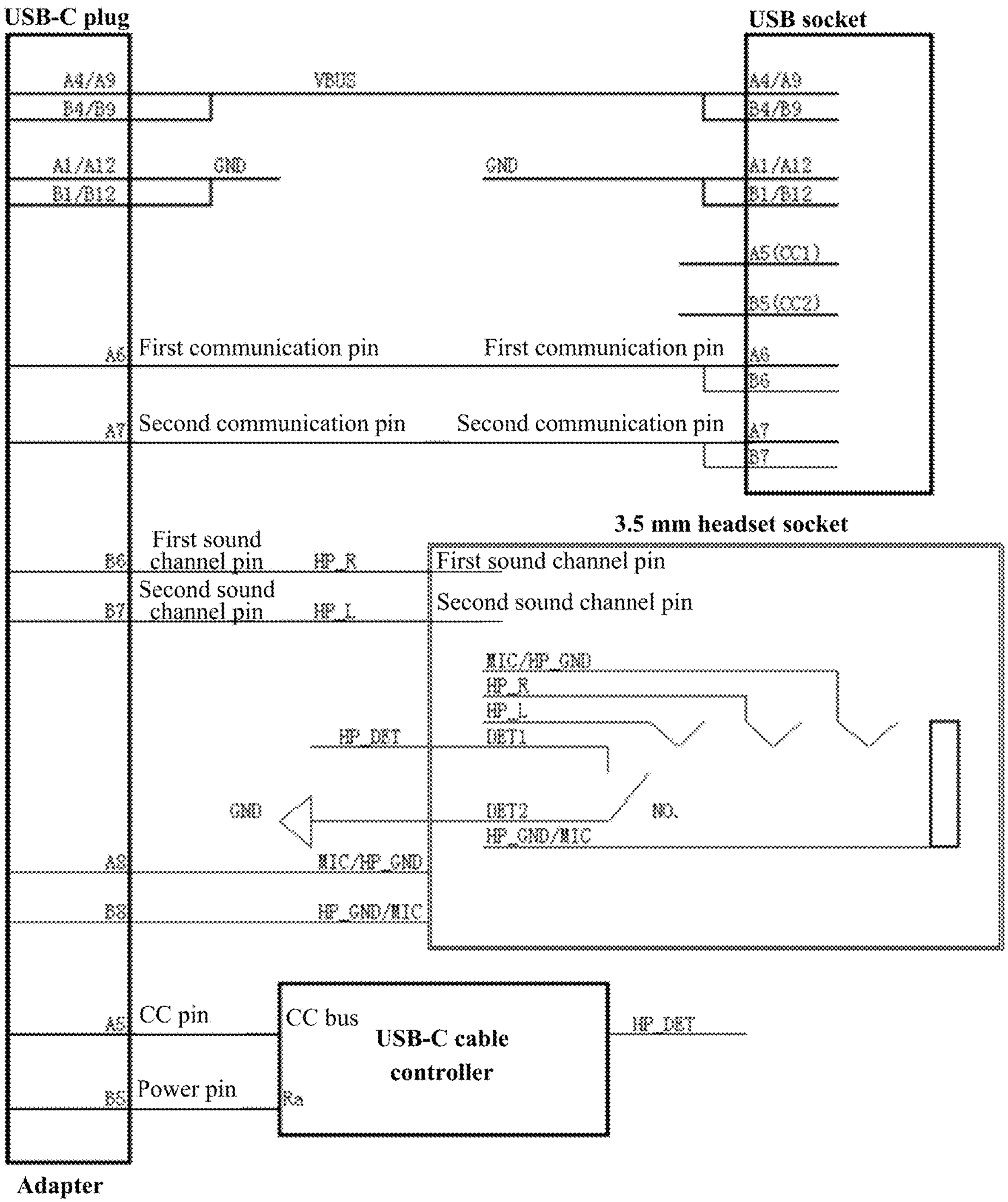
FIG. 6 is a structural diagram of another adapter provided by an embodiment.

Optionally, on the basis of the embodiment shown in FIG. 4, FIG. 6 is a structural diagram of another adapter provided by this embodiment. In addition to the above USB-C plug, the headset socket (e.g., the 3.5 mm headset socket) and the USB plug, the adapter provided by this embodiment may further include a USB-C cable controller. In this embodiment, a power pin (referring to a pin B5 in FIG. 6) of the USB-C plug is connected to a power resistor of the USB-C cable controller. Through the above connection relationship, the adapter provided by this embodiment is further used for, when the adapter is inserted in the USB-C interface of the terminal device, receiving a power voltage (Vconn) outputted by a first CC port or a second CC port of a CC controller module in the terminal device to the power pin through the USB-C cable controller.

No additional power needs to be provided to the adapter in the related art when the adapter is working, that is, the adapter is a passive adapter. In the adapter provided by this embodiment, the USB-C cable controller in the adapter can receive a power voltage transmitted by the CC controller module such that this USB-C cable controller can execute corresponding operations. That is, the adapter provided by this embodiment is a powered adapter.

Optionally, in this embodiment, the USB-C cable controller may be configured to identify a label of the adapter as a preset electronically marked cable assembly (EMCA). In the adapter provided in this embodiment, a CC pin (referring to a pin A5 in FIG. 6) of the USB-C plug is connected to a CC bus of the USB-C cable controller, and on the basis of a connection relationship of the USB-C cable controller, the adapter is further used for, when the adapter is inserted in the USB-C interface of the terminal device, reporting the label of the adapter to the terminal device through the CC bus. After the adapter provided in this embodiment is inserted in the USB-C interface of the terminal device, the label of this adapter can be reported to the terminal device, for example, the label is reported to the CC controller module of the terminal device through the CC bus, and the terminal device can transmit the power voltage (Vconn) to the power pin (e.g., the pin B5 in FIG. 6) of the USB-C plug in the adapter through the first CC port or the second CC port of the CC controller module such that the USB-C cable controller can execute corresponding operations.

The identification function of the USB-C cable controller in this embodiment is used for distinguishing from general USB-C passive adapters. Since the adapter in this embodiment is used as a special powered cable, the USB-C cable controller provided in this adapter can complete the label identification function of the adapter, and identify this adapter as a special EMCA. The EMCA is a part of a USB power delivery (USB PD) protocol, and follows the specification of "SOP'/SOP" Communication with Cable Plugs" in the USB PD protocol. A USB PD encoding manner is a Bi-phase Mark Code (BMC). The USB PD protocol is transmitted in the CC pin, and the USB PD protocol has a Vendor Defined Messages (VDM) function, which defines identification (ID) of a device end, that is, the function can be used for defining the label of the adapter to identify this adapter.

When the adapter is positively inserted in the USB-C interface of the terminal device, the power pin (e.g., the pin B5 in FIG. 6) of the USB-C plug is connected to the second CC port of the CC controller module in the terminal device. At this time, the first CC port is open, and the power voltage is transmitted to the power pin of the USB-C plug through the second CC port. When the adapter is reversely inserted in the USB-C interface of the terminal device, the power pin (e.g., the pin B5 in FIG. 6) of the USB-C plug is connected to the first CC port of the CC controller module in the terminal device. At this time, the second CC port is open, and the power voltage is transmitted to the power pin of the USB-C plug through the first CC port.

Optionally, in this embodiment, detection whether the 3.5 mm headset is inserted or unplugged can also be executed by the USB-C cable controller of the adapter, which replaces a manner in which the CC controller module of the terminal device directly detects the headset inserting and unplugging. In practical application, a headset detection pin (HP_DET) of the USB-C cable controller is connected to a headset detection pin (HP_DET) of the headset socket, and the adapter is further used for detecting, through the USB-C cable controller, a state in which the headset plug is inserted in or unplugged from the headset socket, communicating with the CC controller module of the terminal device through the CC bus, and transmitting headset inserting information or headset unplugging information to the terminal device. For example, when the 3.5 mm headset is inserted, an HP_DET signal is reduced, and when the 3.5 mm headset is unplugged, the HP_DET signal becomes higher.

In this embodiment, a first CC pin and a second CC pin (e.g., pins A5 an B5 in FIGS. 4 and 6) of the USB socket of the adapter may both open such that the adapter can execute solutions of QC quick charging and the DC direct charging.

Figure 7:
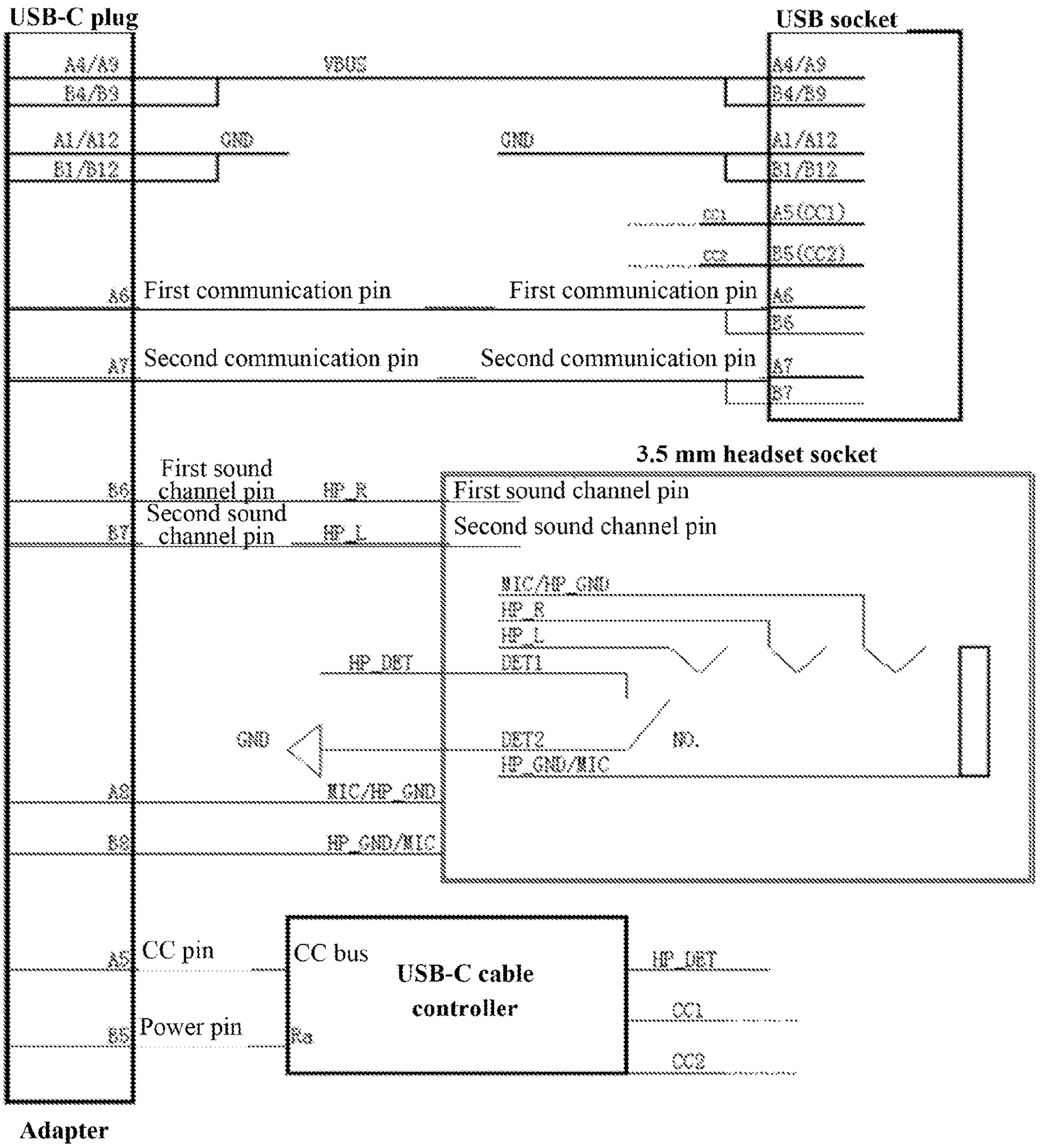
FIG. 7 is a structural diagram of another adapter provided by an embodiment.

Optionally, FIG. 7 is a structural diagram of another adapter provided by this embodiment. The first CC pin (e.g., the pin A5 in FIG. 6) of the USB socket of the adapter shown in FIG. 7 is connected to a first CC port of the UBS-C cable controller, the second CC pin of the USB socket (e.g., the pin B5 in FIG. 6) is connected to a second CC port of the UBS-C cable controller. In this application scenario, when the UBS-C cable controller in the adapter has a Dual Role Port (DRP) function, a USB-PD quick charging function can be supported such that this adapter can become an adapter that can support all quick charging protocols.

It is to be noted that as a complete solution, the adapter provided by this embodiment also completes a compatibility design, satisfies the USB-C standard protocol framework, and is compatible with connection requirements of all terminal devices and external devices that follow the USB-C standard protocol.

Figure 8:
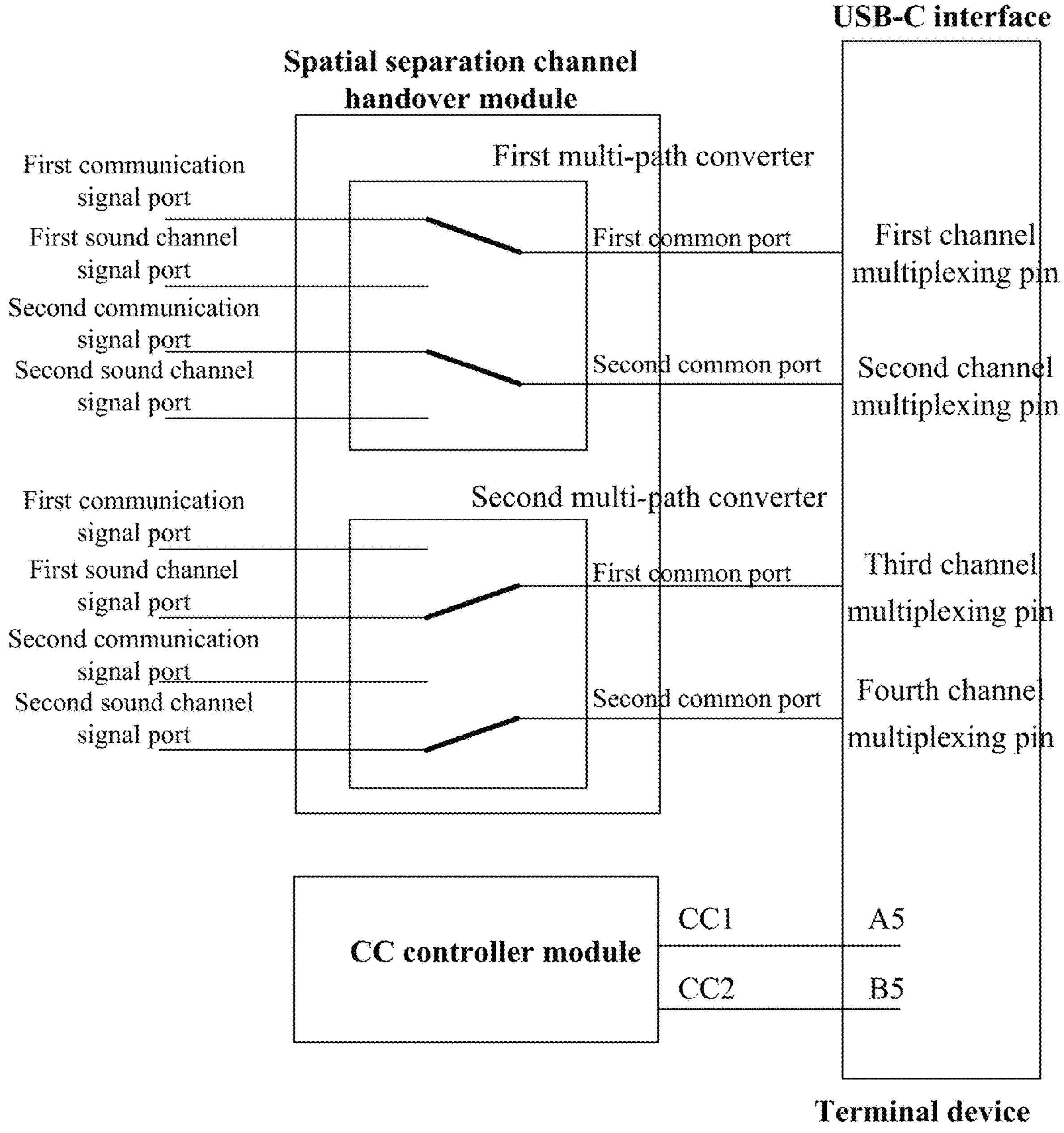
FIG. 8 is a structural diagram of a terminal device provided by an embodiment.

On the basis of the adapter structural design provided by the above embodiments, this embodiment further provides a terminal device. FIG. 8 is a structural diagram of a terminal device provided by this embodiment. A USB interface of the terminal device provided by this embodiment is applicable to a case in which the headset is used while the quick charging is performed. This terminal device may include a USB-C interface cooperatively connected to a USB-C plug of an adapter and a spatial separation channel switching module and a CC controller module.

The USB-C interface may include four channel multiplexing pins. The spatial separation channel switching module may include a first multi-path converter and a second multi-path converter. The first multi-path converter is provided with a first switch. The second multi-path converter is provided with a second switch. A first communication signal port, a right sound channel signal port, a second communication signal port and a left sound channel signal port of the first multi-path converter are connected to a first communication signal port, a right sound channel signal port, a second communication signal port and a left sound channel signal port of the second multi-path converter in one-to-one correspondence (the above connection relationship is not shown in FIG. 8). A first common port and a second common port of the first multi-path converter are connected to a first channel multiplexing pin and a second channel multiplexing pin of the USB-C interface in one-to-one correspondence. A first common port and a second common port of the second multi-path converter are connected to a third channel multiplexing pin and a fourth channel multiplexing pin of the USB-C interface in one-to-one correspondence. The first switch and the second switch both are double-path single pole double throw switches.

Through the above connection manner, the terminal device provided by this embodiment can be used for, when the adapter of any embodiment shown in FIGS. 3 to 7 is inserted in the USB-C interface, simultaneously transmitting two paths of quick charging signals and two paths of sound channel signals through the four channel multiplexing pins of the USB-C interface. In this embodiment, the quick charging can be performed through any two of the above four channel multiplexing pins, the charging power is generally greater than 10 w, such as charging power of 12 w to 25 w, which greatly improves the charging speed and reduces the charging time.

The terminal device provided by this embodiment is further used for, when the adapter is inserted in the USB-C interface and the first CC port (CC1 in FIG. 8) or the second CC port (CC2 in FIG. 8) of the CC controller module detects a power resistor of the power pin of the USB-C plug of the adapter, transmitting the power voltage (Vconn) to the power pin of the USB-C plug through the first CC port or the second CC port of the CC controller module.

Figure 9:
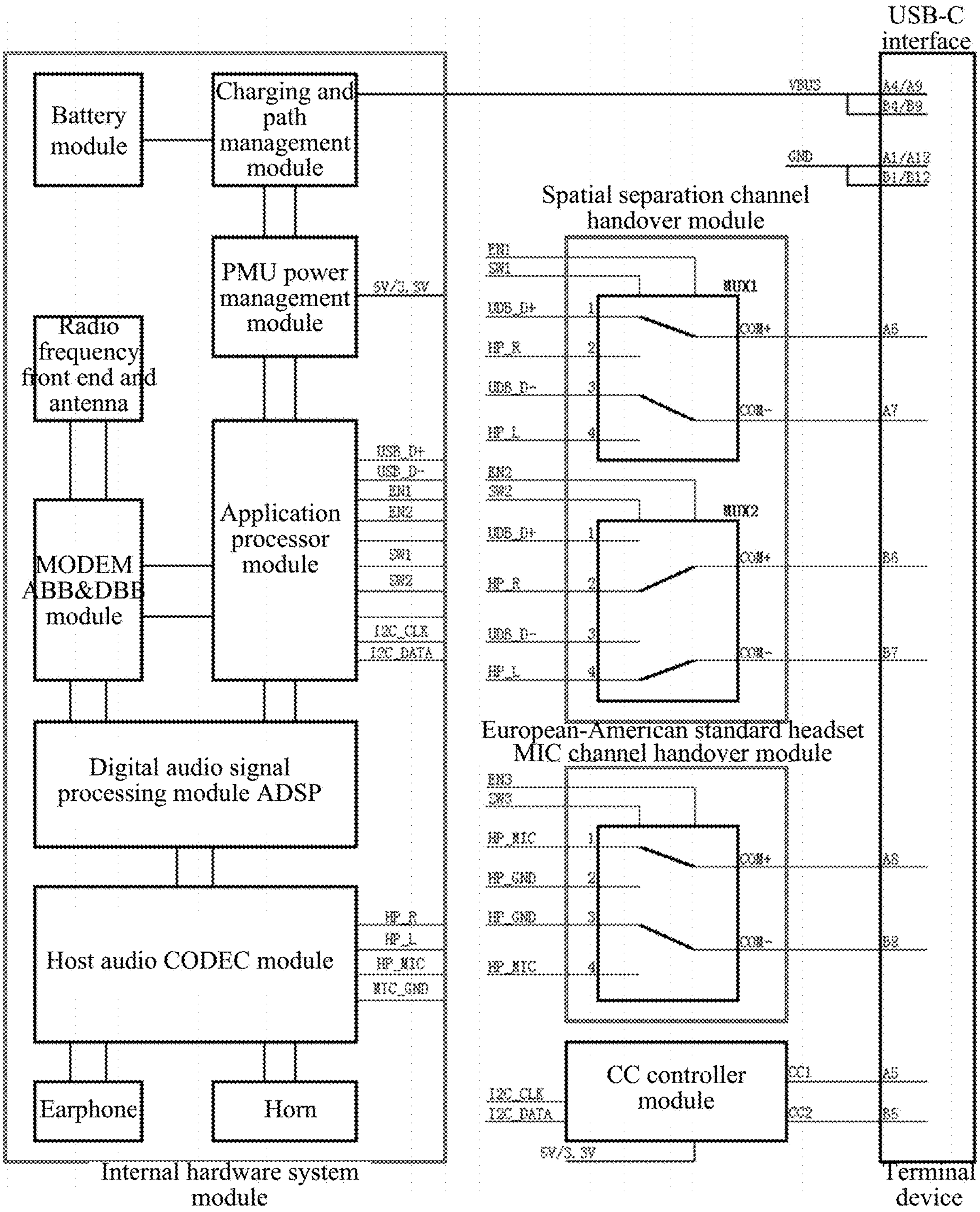
FIG. 9 is a structural diagram of another terminal device provided by an embodiment.

Optionally, FIG. 9 is a structural diagram of another terminal device provided by this embodiment. In FIG. 9, the first multi-path converter and the second multi-path converter can be set to correspond to MUX1 and MUX2 respectively. First communication signal ports, right sound channel signal ports, second communication signal port and left sound channel signal port of MUX1 and MUX2 correspond to ports 1, 2, 3 and 4 respectively. These four ports are used for transmitting a USB_D+ signal, an HP_R signal, a USB_D− signal and an HP_L signal respectively. The first common port and the second common port correspond to COM+ and COM− respectively. The first, second, third and fourth channel multiplexing pins of the USB-C interface correspond to pins A6, A7, B6 and B7 respectively. The first CC port and the second CC port of the CC controller module correspond to ports CC1 and CC2 respectively. The CC controller module is required to support the USB PD protocol.

In the terminal device provided by this embodiment, the spatial separation channel switching module is used for realizing a function of channel separation of left and right sound channel signals and the USB_D+/USB_D− signals, and realize a channel cross adaption function when the adapter is positively inserted and reversely inserted. On the basis that the time-division multiplexing channel switching module provided in FIG. 2 is provided with merely a multi-path converter 1 (e.g. MUX1) having a double-path single pole double throw switch, the terminal device of this embodiment is added with a multi-path converter 2 (e.g. MUX2) with the same structure, that is, the MUX2 is provided with a double-path single pole double throw switch. In addition, in terms of signal connection, short lines between pins A6 and B6 and between pins A7 and B7 of the USB-C interface are deleted. The ports COM+ and COM− of the MUX1 are connected to pins A6 and A7 of the USB-C interface in one-to-one correspondence, and ports COM+ and COM− of the MUX2 are connected to pins B6 and B7 of the USB-C interface in one-to-one correspondence. The same pins of the two multi-path converters (i.e., ports 1, 2, 3 and 4 in FIG. 9) are shorted together respectively (that is, the port 1 of the MUX1 is shorted with the port 1 of the MUX2, the port 2 of the MUX1 is shorted with the port 2 of the MUX2, the port 3 of the MUX1 is shorted with the port 3 of the MUX2, and the port 4 of the MUX1 is shorted with the port 4 of the MUX2), and the above ports 1, 2, 3 and 4 are used for transmitting the USB_D+ signal, the HP_R signal, the USB_D− signal and the HP_L signal in one-to-one correspondence. When the adapter is positively inserted, pins A6, A7, B6 and B7 of the USB-C interface transmit USB_D+/USB_D−/HP_R/HP_L signals in one-to-one correspondence. When the adapter is reversely inserted, pins A6, A7, B6 and B7 of the USB-C interface transmit HP_R/HP_L/USB_D+/USB_D− signals in one-to-one correspondence.

Corresponding to the above embodiment, the CC controller module in this embodiment can, according to the state detected by the first CC port and the second CC port, identify whether the USB-C interface of the terminal device is inserted in the USB-C plug, and determine whether it is inserted positively or reversely. In addition, since the adapter in this embodiment has the identification function, after the adapter is inserted in the USB-C interface of the terminal device provided by this embodiment, the CC controller module connected to this USB-C interface can determine whether the external device is the adapter provided by the above embodiments according to the information reported by the CC bus, and execute the subsequent channel handover function.

The terminal device provided by this embodiment is adapted to the adapter provided by the above embodiments. The spatial separation channel switching module provided in this terminal device can realize the spatial separation of the first communication signal, the second communication signal, the right sound channel signal and the left sound channel signal (i.e., USB_D+, USB_D−, HP_R and HP_L signals) through the two multi-path converters, which realizes the simultaneous transmission of USB_D+, USB_D−, HP_R and HP_L signals after the adapter is positively inserted or reversely inserted in the USB-C interface, and through the manner of connection between the CC controller module provided in the USB-C interface and the USB-C cable controller on the adapter side, can identify whether an external USB device is the adapter provided by this embodiment when the external device is inserted in the USB-C interface of the terminal device. In this embodiment, through the configuration of the two multi-path converters, the simultaneous transmission of USB_D+, USB_D−, HP_R and HP_L signals in the USB-C interface can be realized. That is, two paths of quick charging signals and two paths of sound channel signals are simultaneously transmitted through four channel multiplexing pins of the USB-C interface, which realizes that the terminal is quickly charged while the headset is used, thereby improving the practicability of the adapter and the user experience effect.

Optionally, in this embodiment, the CC controller module is used for, when a USB device is inserted in the USB-C interface, determining whether the USB device is the adapter provided by any one of the above embodiments. Since the adapter provided by embodiments shown in FIGS. 4 to 7 in this embodiment has the identification function, after the CC controller module detects that the USB device is inserted in the USB-C interface, the CC controller module can determine whether this USB device is the adapter provided by this embodiment or another USB device. If this USB device is the adapter provided by this embodiment, identification information reported by the CC bus can be received.

Optionally, in this embodiment, referring to the terminal device shown in FIG. 9, the first multi-path converter MUX1 is provided with a first switch control port (e.g., a port SW1 in FIG. 9) and a first common terminal control port (e.g., a port EN1 in FIG. 9), and the second multi-path converter MUX2 is provided with a second switch control port (e.g., a port SW2 in FIG. 9) and a second common terminal control port (e.g., a port EN2 in FIG. 9).

The first switch control port (the port SW1) and the second switch control port (the port SW2) are used for controlling the first switch and the second switch to throw upward or throw downward in one-to-one correspondence according to a switch control signal outputted by an application processor module of the terminal device.

The first common terminal control port (the port EN1) and the second common terminal control port (the port EN2) are used for controlling two common ports (i.e., ports COM+ and COM−) of the first multi-path converter and two common ports (i.e., ports COM+ and COM−) of the second multi-path converter to connect and disconnect in one-to-one correspondence according to a common terminal control signal outputted by the application processor module of the terminal device.

In this embodiment, the control signals inputted by ports SW1, SW2, EN1 and EN2 are controlled by the application processor module of the terminal device. After the adapter is inserted in the USB-C interface, according to determination of the CC controller module on the external device and determination on positive insertion and reverse insertion, a corresponding control signal can be outputted. In practical application, the first switch/the second switch can be controlled to throw upward or throw downward through the switch control signal inputted by ports SW1 and SW2 to hand over the channel, and common ports (i.e., ports COM+/COM−) of MUX1/MUX2 are controlled to connect or disconnect through the common terminal control signal inputted by ports EN1/EN2. Identification and determination of the positive or reverse insertion state are completed by the CC controller module of the terminal device. Table 1 is a connection state identification list of the terminal device provided with the USB_C interface. As a special Powered Cable/No Upstream Facing Port (UFP) component, a UFP of the adapter can be applicable to cases of Nos. 4 and 5 in Table 1. When the adapter is inserted, the terminal device, after detecting the power resistor (Ra) of the power pin (the pin B5 in FIG. 5C) of the USB-C plug of the adapter through the first CC port and the second CC port (i.e., ports CC1 and CC2) of the CC controller module, outputs the power voltage (Vconn) to the pin B5 of the USB-C plug, such as 5V or 3.3V (limited within 1 W).

Figure 10:
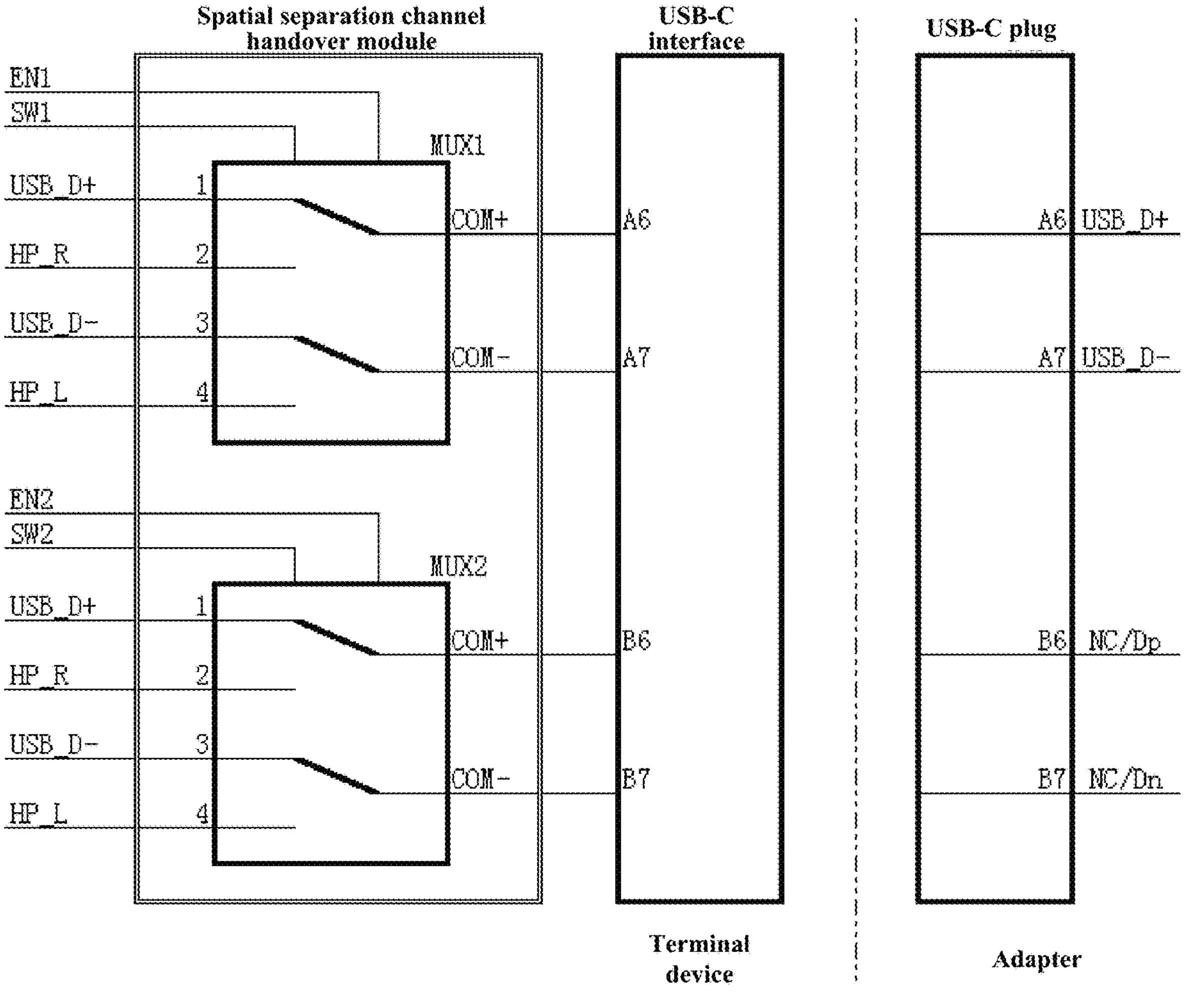
FIG. 10 is a schematic diagram of a principle of an operating state of a terminal device provided by an embodiment.
Figure 11:
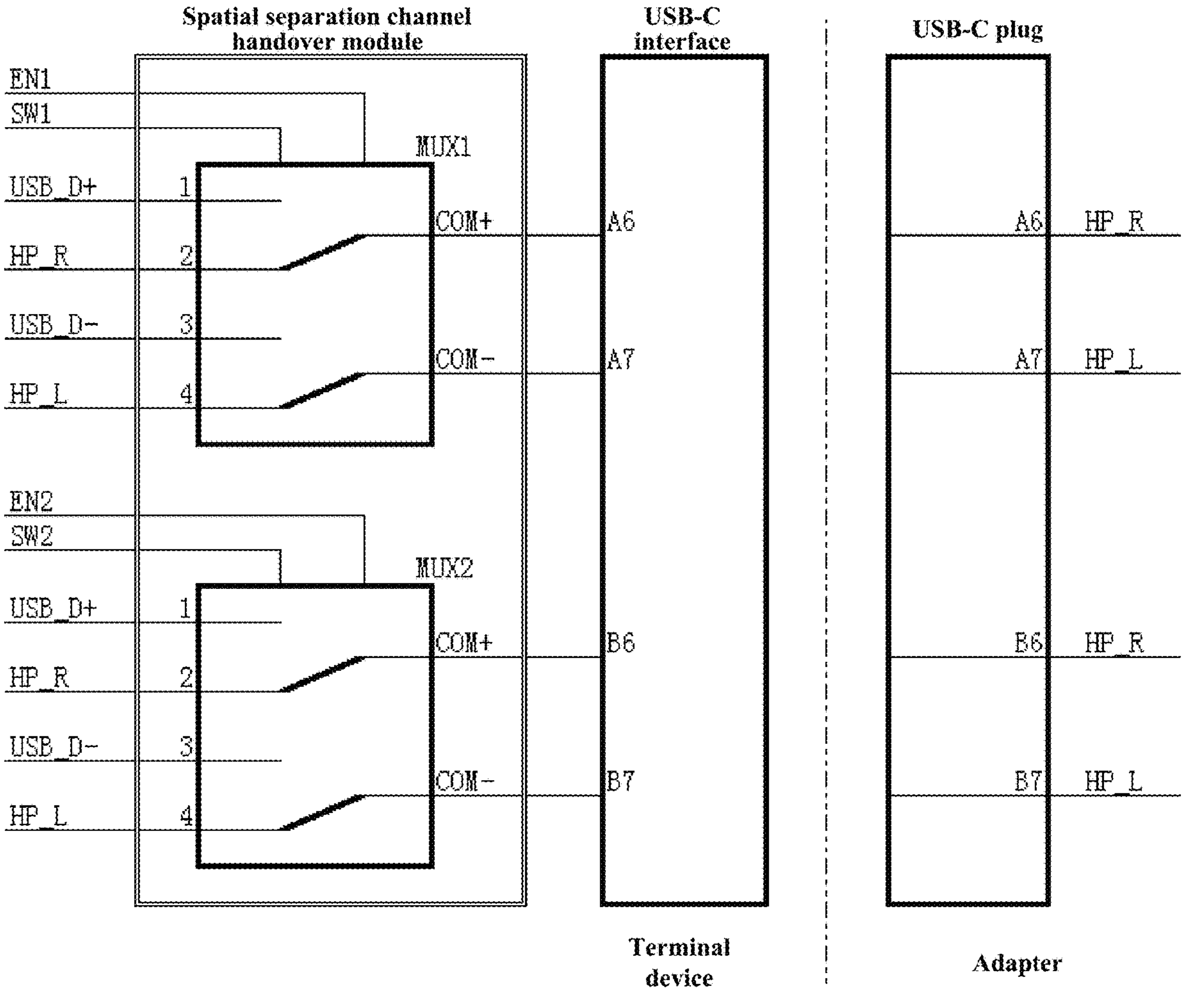
FIG. 11 is a schematic diagram of a principle of another operating state of a terminal device provided by an embodiment.
Figure 12:
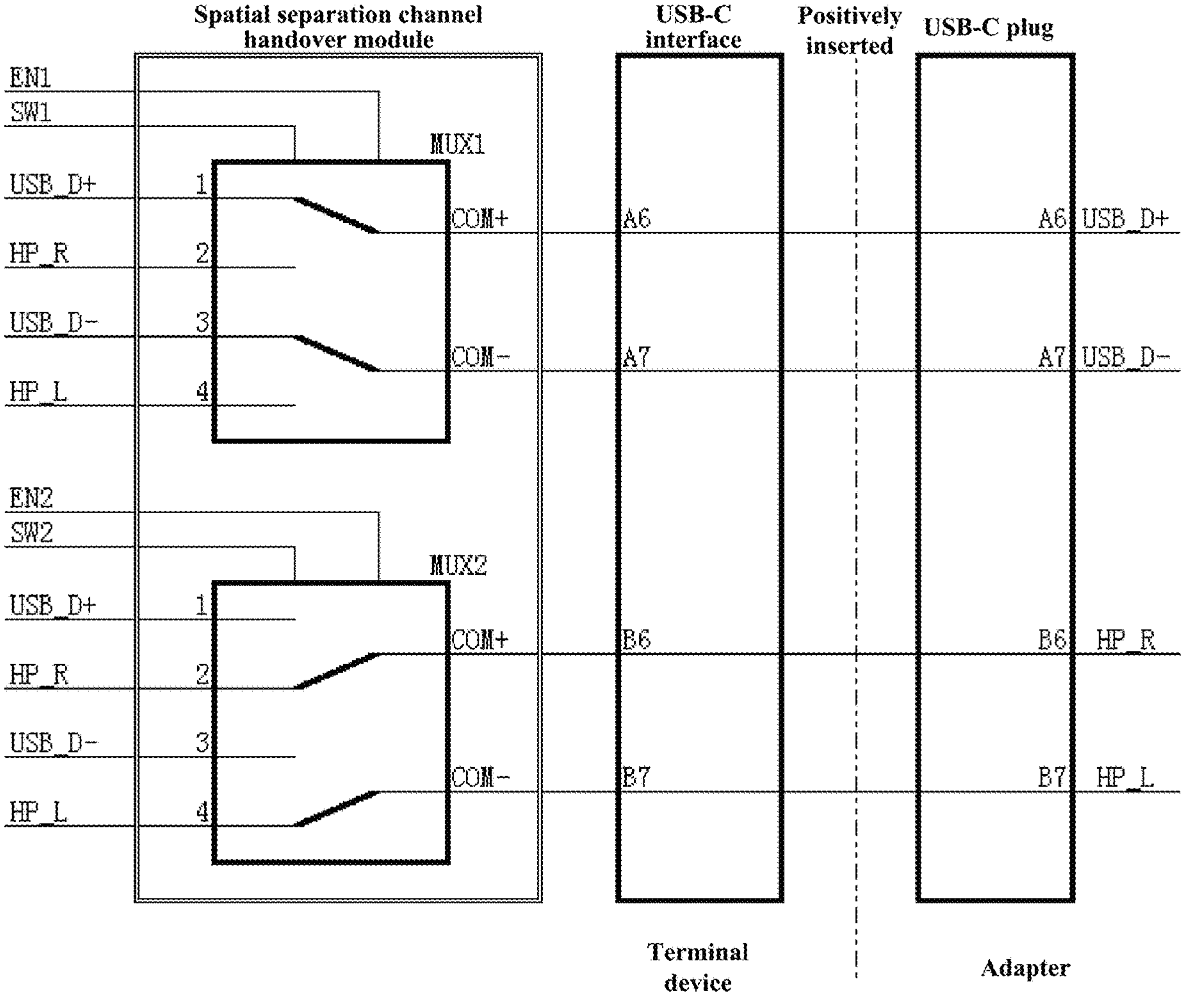
FIG. 12 is a schematic diagram of a principle of another operating state of a terminal device provided by an embodiment.
Figure 13:
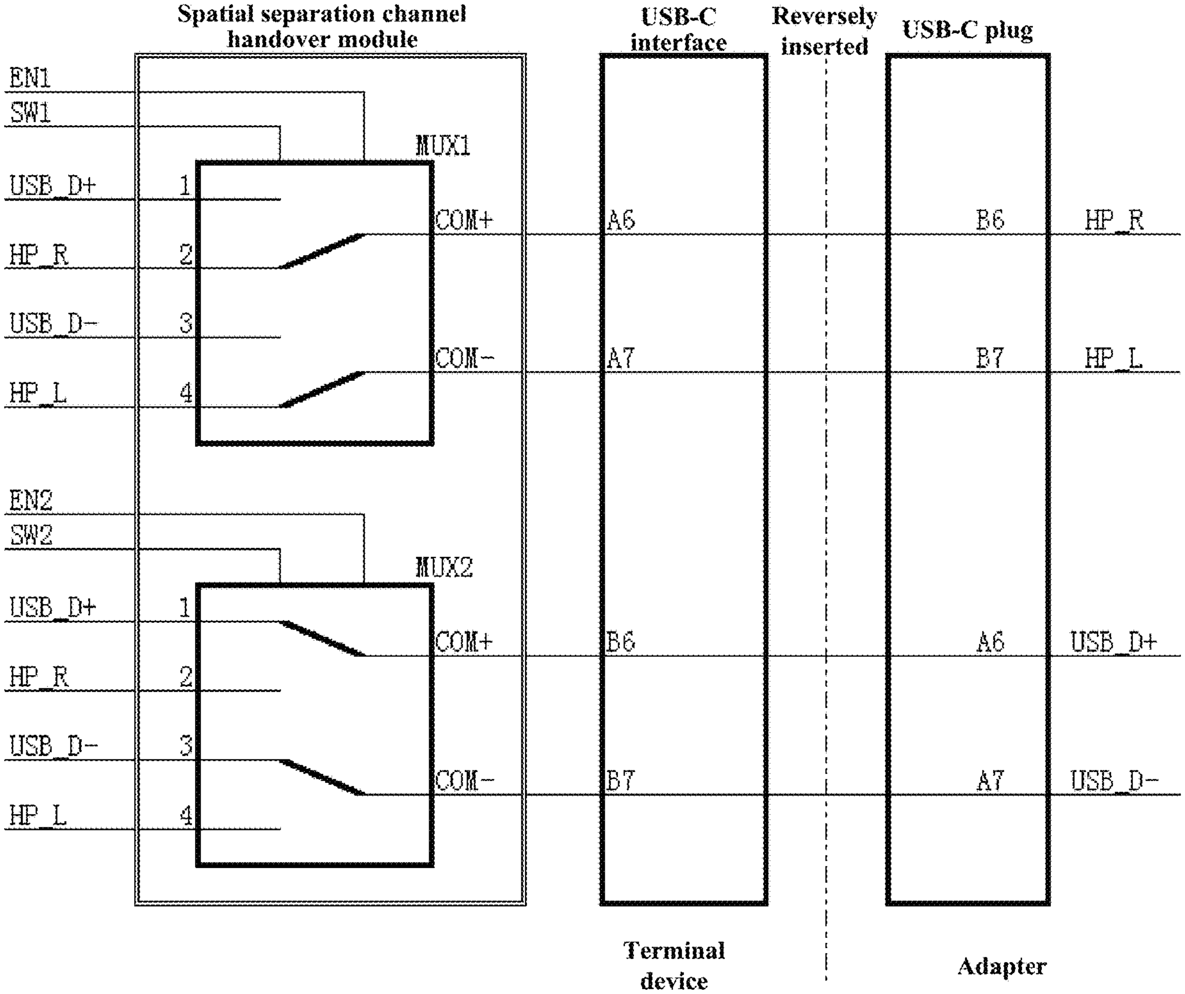
FIG. 13 is a schematic diagram of a principle of another operating state of a terminal device provided by an embodiment.

An operating state of the terminal device provided by this embodiment includes the state of 9 in above Table 1. FIG. 10 is a schematic diagram of a principle of an operating state of a terminal device provided by this embodiment. FIG. 11 is a schematic diagram of a principle of another operating state of a terminal device provided by this embodiment. FIG. 12 is a schematic diagram of a principle of another operating state of a terminal device provided by this embodiment. FIG. 13 is a schematic diagram of a principle of another operating state of a terminal device provided by this embodiment. In addition to adapting to the adapter (the special Powered Cable/No UFP connected) provided by this embodiment, the USB-C interface on the terminal device side also satisfies USB-C connection compatibility in the related art. Refer to 9 cases in Table 1: Nothing connected, UFP connected positively/reversely inserted, Powered Cable/No UFP connected positively/reversely inserted, Powered Cable/UFP connected positively/reversely inserted, Debug Accessory Mode connected and Audio Adapter Accessory Mode connected.

When the CC controller module identifies that the operating state is a default operating state (i.e., Nothing connected), switch control signals of two multi-path converters of the spatial separation channel switching module control two switches to throw upward simultaneously through ports SW1 and SW2, pins A6 and B6 of the USB-C interface both are connected to the USB_D+ signal, pins A7 and B7 both are connected to the USB_D− signal, and the channel handover operation is performed in a manner shown in FIG. 10.

When the CC controller module identifies that the operating state is a Powered Cable/No UFP connected (that is, ports CC1 and CC2 detect that one pin is the resistance Ra

TABLE 1

| No. | CC1 | CC2 | State | Position | USB-C plug pin standard definition | USB-C plug pin definition change |
|---|---|---|---|---|---|---|
| 1 | Open | Open | Nothing connected | N/A | / | / |
| 2 | Rd | Open | UFP connected | 1 (positively inserted) | A6 and A7 are defined as D+/D−; B6, B7 are not defined | A6 and A7 are defined as D+/D−; B6, B7 are self-defined as HP_R/HP_L |
| 3 | Open | Rd | | 2 (reversely inserted) | | |
| 4 | Open | Ra | Powered Cable/No UFP connected | 1 (positively inserted) | A6 and A7 are defined as D+/D−; B6, B7 are not defined | A6 and A7 are defined as D+/D−; B6, B7 are self-defined as HP_R/HP_L |
| 5 | Ra | Open | | 2 (reversely inserted) | | |
| 6 | Rd | Ra | Powered Cable/UFP connected | 1 (positively inserted) | A6 and A7 are defined as D+/D−; B6, B7 are not defined | A6 and A7 are defined as D+/D−; B6, B7 are self-defined as HP_R/HP_L |
| 7 | Ra | Rd | | 2 (reversely inserted) | | |
| 8 | Rd | Rd | Debug Accessory Mode connected | N/A (no positive or reverse insertion can be identified) | A6 and B6 are shorted and defined as D+; A7 and B7 are shorted and defined as D− | Same standard |
| 9 | Ra | Ra | Audio Adapter accessory Mode connected | N/A (no positive or reverse insertion can be identified) | A6 and B6 are shorted and defined as HP_R; A7 and B7 are shorted and defined as HP_L | Same standard |

and the other pin is open), the terminal device transmits the power voltage of 5V or 3.3V to the pin B5 of the USB-C plug of the adapter through the port CC1 or CC2 according to the positive and reverse insertion connection state to power on the USB-C cable controller, the CC controller module and USB-C cable controller perform the handshake communication through the CC bus and perform cable ID identification, and then the CC controller module reports the identified ID and the positive and reverse insertion connection state to the application processor module. If the identified ID is the ID of the adapter provided by this embodiment, in conjunction with the condition of the positive and reverse insertion, the application processor module controls the spatial separation channel switching module to perform the channel handover operation in accordance with the manner shown in FIGS. 12 and 13.

In practical application, when the adapter is positively inserted in the USB-C interface, the first switch of the first multi-path converter is thrown upward, the second switch of the second multi-path converter is thrown downward, and four channel multiplexing pins (i.e., pins A6, A7, B6 and B7) of the USB-C interface are used for transmitting the first communication signal, the second communication signal, the right sound channel signal and the left sound channel signal (i.e., USB_D+, USB_D−, HP_R and HP_L signals) in one-to-one correspondence, as shown in FIG. 12; when the adapter is reversely inserted in the USB-C interface, the first switch of the first multi-path converter is thrown downward, the second switch of the second multi-path converter is thrown upward, and four channel multiplexing pins (i.e., pins A6, A7, B6 and B7) of the USB-C interface are used for transmitting the right sound channel signal, the left sound channel signal, the first communication signal and the second communication signal (i.e., HP_R, HP_L, USB_D+ and USB_D− signals) in one-to-one correspondence, as shown in FIG. 13. If the identified ID is not the ID of the adapter provided by this embodiment, the application processor module controls the spatial separation channel switching module to perform the channel handover operation in accordance with the manner shown in FIG. 10.

In a state that the adapter is inserted in the USB-C interface, the CC controller module is further used for, after the port CC1 or CC2 detects the resistance Ra of the pin B5 of the USB-C plug, outputting the power voltage to the pin B5 of the USB-C plug. In practical application, when the adapter is positively inserted in the USB-C interface, the port CC2 of the CC controller module is connected to the power pin (i.e., the pin B5 in FIG. 5C) of the USB-C plug. At this time, the CC controller module outputs the power voltage to the power pin B5 of the USB-C plug through the CC2 port. When the adapter is reversely inserted in the USB-C interface, the CC1 port of the CC controller module is connected to the power pin (i.e., the pin B5 in FIG. 5C) of the USB-C plug. At this time, the CC controller module outputs the power voltage to the power pin B5 of the USB-C plug through the CC1 port.

When the CC controller module identifies that the operating state is Audio Adapter Accessory Mode connected (i.e., ports CC1 and CC2 both detect a resistance less than Ra), switch control signals of two multi-path converters control two switches to throw downward simultaneously through ports SW1 and SW2, pins A6 and B6 of the USB-C interface both are connected to the HP_L signal, pins A7 and B7 both are connected to the HP_R signal, and the channel handover operation is performed in a manner shown in FIG. 11.

When the CC controller module identifies that the operating state is Debug Accessory Mode connected (i.e., ports CC1 and CC2 both detect the resistance Rd), switch control signals of two multi-path converters control two switches to throw upward simultaneously through ports SW1 and SW2, pins A6 and B6 both are connected to the USD D+ signal, and pins A7 and B7 both are connected to the USD_D− signal. For better signal quality, only one switch can be enabled through the control signal EN1 or EN2, and the channel handover operation is performed in the manner shown in FIG. 10.

When the CC controller module identifies that the operating state is UFP connected or Powered Cable/UFP connected (i.e., ports CC1 and CC2 detect the resistance Rd), the operating state of the spatial separation channel switching module is also shown in FIG. 10, switch control signals of two multi-path converters control two switches to throw upward simultaneously through ports SW1 and SW2, pins A6 and B6 both are connected to the USD D+ signal, and pins A7 and B7 both are connected to the USD_D− signal.

Optionally, in this embodiment, the CC controller module that is adapted to the adapter provided by the above embodiments is further used for determining a state in which the headset plug is inserted in or unplugged from the headset socket in the adapter according to headset inserting information or headset unplugging information transmitted by the USB-C cable controller of the adapter through the CC bus. That is, detection whether the 3.5 mm headset is inserted or unplugged is executed by the USB-C cable controller of the adapter, which replaces a manner in which the CC controller module directly detects the headset inserting and unplugging state.

The terminal device provide by this embodiment can implement following content.

(1) The headset and the charging function both can be completed through the USB-C interface of the terminal device.

(2) The quick charging and the use of the headset can be performed simultaneously, a relatively independent channel exists physically, and when the terminal device identifies that it is the adapter provided by this embodiment that is inserted in the USB-C interface, the quick charging signals USB_D+/USB_D− and the analog headset left and right sound channel signals HP_R/HP_L can simultaneously traverse the USB-C interface.

(3) In addition to supporting the adapter provided by this embodiment, the USB-C interface of the terminal device also supports the access of different peripherals in the related art, such as an analog headset, a USB device, a passive adapter and the like. The interface adaption function of different peripherals can be handed over through the spatial separation channel switching module, and for its implementation manner, see the manner shown in FIGS. 10 to 13.

(4) The identification on peripherals by the terminal device is completed through the CC controller module, and the CC controller module is required to support the USD PD function.

Figure 14:
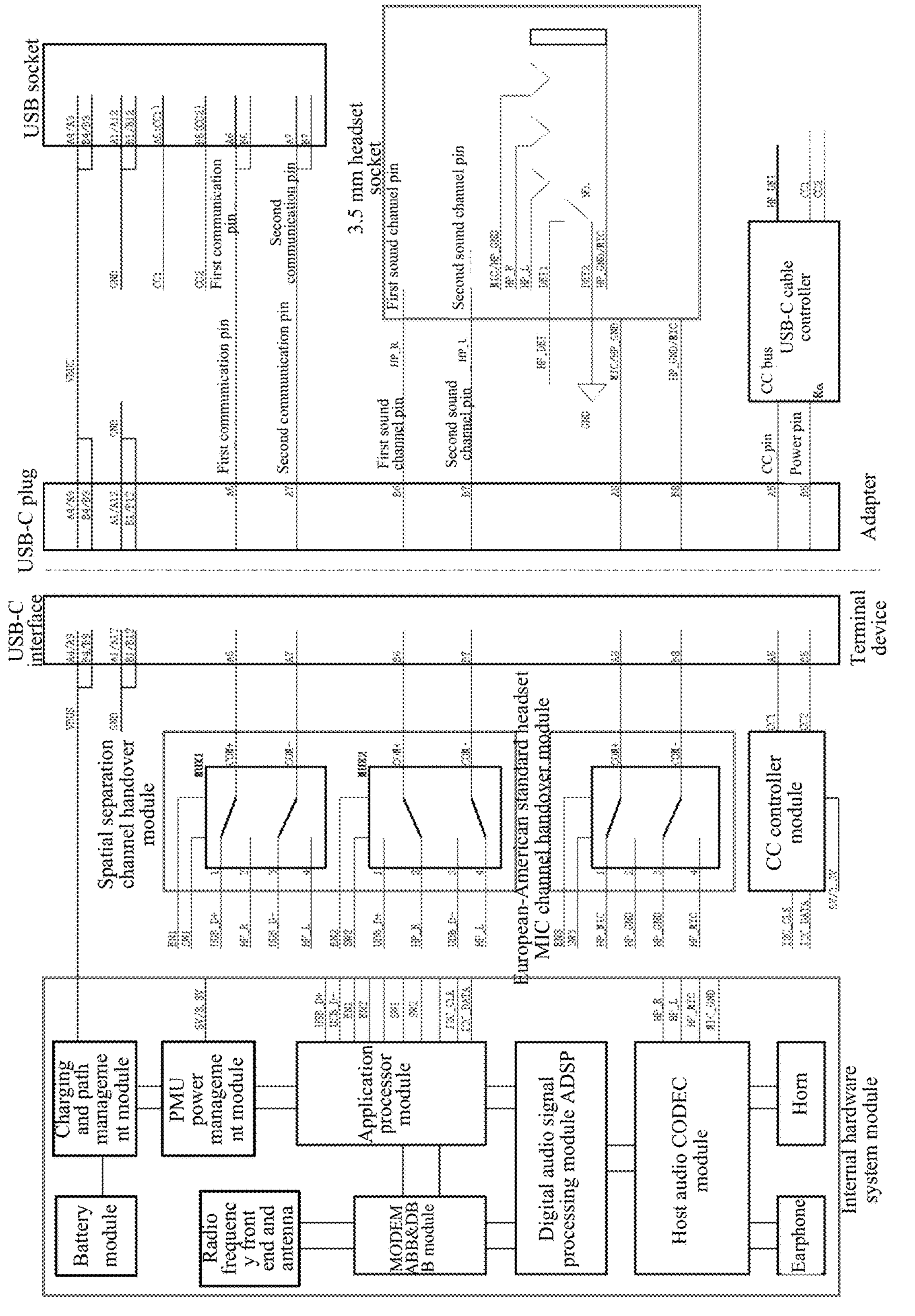
FIG. 14 is a structural diagram of an adapter system provided by an embodiment.

On the basis of the adapter and the USB-C interface provided by the above embodiments, this embodiment further provides an adapter system. FIG. 14 is a structural diagram of an adapter system provided by this embodiment. As shown in FIG. 14, this adapter system is applicable to a case in which the headset is used while the quick charging is performed. This adapter system includes the adapter in any one of embodiments shown in FIGS. 4 to 7 and the terminal device in any one of embodiments shown in FIGS. 8 to 13.

In this embodiment, the working procedure of the adapter system is as follows.

A power-on initial state is a state of the spatial separation channel switching module shown in FIG. 10. The switch control signal simultaneously controls switches to throw upward and connect to the USB channel through ports SW1 and SW2. The signal port USD_D+ is simultaneously connected to pins A6 and B6 of the USB-C interface. The signal port USD_D− is simultaneously connected to pins A7 and B7 of the USB-C interface. The ports CC2 and CC2 of the CC controller module detect voltages of pins A5 and B5 of the USB-C interface.

In step 1, the adapter is inserted in the USB-C interface of the terminal device, and the power resistor Ra connected to the pin B5 of the USB-C plug of the adapter is connected to the port CC1 or CC2 of the CC controller module of the terminal device through the pin A5 and B5 of the USB-C interface. Only of pins connected to ports CC1 and CC2 of the CC controller module monitors the voltage change and the voltage value corresponds to Ra. The USB-C interface of the terminal device enters the Powered Cable/No UFP connected connection state.

If the port CC1 is open and the port CC2 detects the resistance Ra, it means the adapter is positively inserted. If the port CC1 detects the resistance Ra and the port CC2 is open, it means the adapter is reversely inserted. Reference is made to the cases of the Nos. 4 and 5 in Table 1.

In step 2, the CC controller module reports identified Powered Cable/No UFP connected connection state information to the application processor module of the terminal device. The application processor module controls a power management module to output 5V/3.3V voltage power supply, and transmits the power voltage to the pin B5 of the USB-C plug of the adapter through the port CC1 or CC2, that is, to supply power to the USB-C cable controller. When the adapter is positively inserted, the port CC2 is connected to the USB-C cable controller, and when the adapter is reversely inserted, the port CC1 is connected to the USB-C cable controller. In step 3, the CC controller module and the adapter of the terminal device are mutually authenticated through the CC bus. For example, the terminal device reads ID information of Powered Cable, identifies that this external USB device is the adapter provided by this embodiment, and sends acknowledgement information to the USB-C cable controller of the adapter through the CC bus to perform ID and support capability acknowledgement. If the USB-C cable controller of the adapter does not receive the acknowledgement information sent by the terminal device, this adapter only works as a common powered cable.

In step 4, the application processor module can control the spatial separation channel switching module to perform the channel handover in manners shown in FIGS. 10 and 13. When the adapter is positively inserted, the signal ports USB_D+ and USB_D− are connected to pins A6 and A7 of the USB-C interface respectively, and the signal ports HP_R and HP_L are connected to pins B6 and B7 of the USB-C interface respectively. When the adapter is reversely inserted, the signal ports USB_D+ and USB_D− are connected to pins B6 and B7 of the USB-C interface respectively, and the signal ports HP_R and HP_L are connected to pins A6 and A7 of the USB-C interface respectively.

In step 5, the headset insertion detection and the USB-C quick charging communication.

The headset insertion detection is that the USB-C cable controller detects an insertion condition of the 3.5 mm headset through GPIO connected to the headset detection pin HP_DET. When no 3.5 mm headset is inserted, the GPIO connected to the HP_DET is in a high state because it is connected to a pull-up resistance; and when the 3.5 mm headset is inserted, the GPIO connected to the HP_DET is forced to pull down to a ground level. The USB-C cable controller module reports this condition to the terminal device through the CC bus and notifies the terminal device that a 3.5 mm headset is inserted, and the terminal device knows this information and controls internal signals such that the analog headset signal is outputted through the USB-C.

The USB quick charging communication is that since the USB_D+/USB_D− channel has already built in step 4, the USB plug of the adapter, once it is inserted in a QC quick charging adapter or a DC direct quick charging adapter, can perform handshake communication with the terminal device through a USB_D+/USB_D− bus to perform quick charging voltage and current setting and perform the quick charging.

In step 6, the 3.5 mm headset is unplugged and the adapter is unplugged.

Unplugging the 3.5 mm headset means that the USB-C cable controller of the adapter monitors the level of the HP_DET at any time and when the level of the pin HP_DET is monitored to be changed from low to high, determines that the 3.5 mm headset is unplugged, the USB-C cable controller notifies the terminal device that the 3.5 mm headset is unplugged through the CC bus, the terminal device hands over audio signals to other playing channels (e.g., an earphone or horn channel and the like), and the USB-C cable controller continues to monitor the change of the pin HP_DET.

Unplugging the adapter means that the CC controller module of the terminal device detects changes of ports CC1 and CC2 at any time, and determines that the adapter is unplugged through voltage and current changes of the two ports CC1 and CC2. Once the terminal device knows that the adapter is unplugged, the terminal device will close a Vconn power supply channel, put the spatial separation channel switching module in a conventional USB 2.0 mode, i.e., the state shown in FIG. 10, and disconnect the headset channel, and two switches both are connected to USB_D+/USB_D− signals. The CC controller module of the terminal device continues to monitor the two ports CC, and the terminal device retunes the power-on initial state.

The adapter system provided by this embodiment includes the terminal device and the adapter. The interactivity signal between the terminal device and the adapter and analog headset left and right sound channel signals and USB_D+/USB_D− signals between the terminal device and the adapter all have relatively independent channels, and can be simultaneously transmitted between the terminal device and the adapter through the USB-C interface. The main function of this adapter system may include following content.

(1) The right and left sound channel signals HP_R/HP_L and the quick charging signals USB_D+/USB_D− can be simultaneously transmitted between the terminal device and the adapter through the USB-C interface; meanwhile, the transmitted right and left sound channel signals HP_R/HP_L and the quick charging signals USB_D+/USB_D− use pins A6, A7, B6 and B7 of the USB-C interface and the USB-C plug.

(2) In the adapter system, the USB-C plug of the adapter side completes a signal definition function: USB_D+/USB_D− signals of the adapter side are defined to the pins A6 and A7 of the USB-C plug, and right and left sound channel signals HP_R/HP_L of the analog headset are defined to the pins B6 and B7 of the USB-C plug.

(3) The adapter system completes a positive and reverse insertion cross adaption function of the signal on the USB-C interface of the terminal device side: when the USB-C plug of the adapter is positively inserted in the USB-C interface of the terminal device, pins A6 and A7 and pins B6 and B7 of the USB-C interface deliver USB_D+/USB_D− and HP_R/HP_L signals respectively; and when the USB-C plug of the adapter is reversely inserted in the USB-C interface of the terminal device, pins A6 and A7 and pins B6 and B7 of the USB-C interface deliver HP_R/HP_L and USB_D+/USB_D− signals respectively. The spatial separation channel switching module executes positive insertion and reverse insertion channel cross adaption between the USB-C interface and internal hardware system modules of the terminal device.

(4) The adapter has an identification function: identification is performed through the USB-C cable controller as a special EMCA.

On the basis of the technical solutions provided by this embodiment, when whether other products have infringement behaviors are determined, the infringement behaviors can be known through simple reverse engineering analysis; information of the infringement behaviors can be obtained through communication with the supplier; and the infringement behaviors can be determined by monitoring pin signal waveforms of the USB-C interface when the headset works, which includes operations: whether the pins A6, A7, B6 and B7 have different signal waveforms simultaneously is measured when the signals of the USB port work, whether two double-path single pole double throw switch chips with the same model are simultaneously arranged near the USB-C interface of the terminal device is observed, and the circuit structure of the other products can be reversely deduced based on these two points.

This embodiment solves a technical problem that in USB-C interface All in ONE (i.e., functions of headset and charging and the like are realized through only one USB-C interface), a terminal device cannot use an analog headset while it is quickly charged, thereby improving use experience of users and improving competitiveness of a product.

What is claimed is:

1. An adapter, comprising: a universal serial bus type-C (USB-C) plug cooperatively connected to a USB-C interface of a terminal device, a USB socket cooperatively connected to a charging plug, and a headset socket cooperatively connected to a headset plug; wherein a first communication pin of the USB-C plug is connected to a first communication pin of the USB socket, a second communication pin of the USB-C plug is connected to a second communication pin of the USB socket, and a first sound channel pin and a second sound channel pin of the USB-C plug are connected to a right sound channel signal pin and a left sound channel signal pin of the headset socket in one-to-one correspondence;

wherein the first communication pin and the second communication pin of the USB-C plug are pings A6 and A7, respectively, and the first sound channel pin and the second channel pin of the USB-C plug are pins B6 and B7, respectively;

wherein the first communication pin and the second communication pin of the USB socket are a USB_D+ pin and a USB_D− pin, respectively;

wherein a pin A6 of the USB-C plug is connected to the USB_D+ pin of the USB socket, a pin A7 of the USB-C plug is connected to the USB_D− pin of the USB socket, a pin B6 of the USB-C plug is connected to the right sounds channel signal pin of the headset socket, and a pin B7 of the USB-C plug is connected to the left sound channel signal pin of the headset socket; and the adapter is used for, when the adapter is inserted in the USB-C interface of the terminal device, transmitting a quick charging signal to the terminal device through the first communication pin and the second communication pin of the USB-C plug while receiving a sound channel signal from the terminal device through the first sound channel pin and the second sound channel pin of the USB-C plug;

wherein a charging power of the quick charging signal is greater than 10 watts (W).

2. The adapter of claim 1, wherein when the adapter is positively inserted in the USB-C interface of the terminal device, the first communication pin, the second communication pin, the first sound channel pin and the second sound channel pin of the USB-C plug are connected to a first channel multiplexing pin, a second channel multiplexing pin, a third channel multiplexing pin and a fourth channel multiplexing pin of the USB-C interface of the terminal device in one-to-one correspondence; and when the adapter is reversely inserted in the USB-C interface of the terminal device, the first sound channel pin, the second sound channel pin, the first communication pin and the second communication pin of the USB-C plug are connected to the first channel multiplexing pin, the second channel multiplexing pin, the third channel multiplexing pin and the fourth channel multiplexing pin of the USB-C interface of the terminal device in one-to-one correspondence.

3. The adapter of claim 1, wherein each of the first communication pin and the second communication pin of the USB socket comprises two pins.

4. The adapter of claim 1, further comprising a USB-C cable controller, wherein a power pin of the USB-C plug is connected to a power resistor of the USB-C cable controller; and wherein the adapter is further used for, when the adapter is inserted in the USB-C interface of the terminal device, receiving a power voltage transmitted by a first configuration channel (CC) port or a second CC port of a CC controller module in the terminal device through the power pin of the USB-C plug, and providing the power voltage for the USB-C cable controller.

5. The adapter of claim 4, wherein the USB-C cable controller is used for identifying a label of the adapter as a preset electronically marked cable assembly (EMCA); wherein a CC pin of the USB-C plug is connected to a CC bus of the USB-C cable controller, and wherein the adapter is further used for, when the adapter is inserted in the USB-C interface of the terminal device, reporting the label of the adapter to the terminal device through the CC bus and the CC pin of the USB-C plug.

6. The adapter of claim 4, wherein when the adapter is positively inserted in the USB-C interface of the terminal device, the power pin of the USB-C plug is connected to the second CC port of the CC controller module in the terminal device; and when the adapter is reversely inserted in the USB-C interface of the terminal device, the power pin of the USB-C plug is connected to the first CC port of the CC controller module in the terminal device.

7. The adapter of claim 4, wherein a headset detection pin of the USB-C cable controller is connected to a headset detection pin of the headset socket; and wherein the adapter is further used for detecting a state in which the headset plug is inserted in or unplugged from the headset socket through the USB-C cable controller, communicating with the CC controller module of the terminal device through the CC bus of the USB-C cable controller, and transmitting headset inserting information or headset unplugging information to the terminal device.

8. The adapter of claim 1, wherein both a first CC pin and a second CC pin of the USB socket are in an open state.

9. The adapter of claim 1, further comprising a USB-C cable controller, wherein a first CC pin and a second CC pin of the USB socket are connected to a first CC port and a second CC port of the USB-C cable controller in one-to-one correspondence.

10. A terminal device, comprising: a universal serial bus type-C (USB-C) interface cooperatively connected to a USB-C plug of an adapter, a spatial separation channel switching module and a channel configuration (CC) controller module;

wherein the USB-C interface comprises four channel multiplexing pins, the spatial separation channel switching module comprises a first multi-path converter and a second multi-path converter, wherein the first multi-path converter is provided with a first switch, the second multi-path converter is provided with a second switch; wherein a first communication signal port, a right sound channel signal port, a second communication signal port and a left sound channel signal port of the first multi-path converter are connected to a first communication signal port, a right sound channel signal port, a second communication signal port and a left sound channel signal port of the second multi-path converter in one-to-one correspondence, a first common port and a second common port of the first multi-path converter are connected to a first channel multiplexing pin and a second channel multiplexing pin of the USB-C interface in one-to-one correspondence, and a first common port and a second common port of the second multi-path converter are connected to a third channel multiplexing pin and a fourth channel multiplexing pin of the USB-C interface in one-to-one correspondence;

wherein the adaptor comprises: the USB-C plug cooperatively connected to the USB-C interface of the terminal device, a USB socket cooperatively connected to a charging plug, and a headset socket cooperatively connected to a headset plug; wherein a first communication pin of the USB-C plug is connected to a first communication pin of the USB socket, a second communication pin of the USB-C plug is connected to a second communication pin of the USB socket, and a first sound channel pin and a second sound channel pin of the USB-C plug are connected to a right sound channel signal pin and a left sound channel signal pin of the headset socket in one-to-one correspondence;

wherein the first communication pin and the second communication pin of the USB-C plug are pings A6 and A7, respectively, and the first sound channel pin and the second channel pin of the USB-C plug are pins B6 and B7, respectively;

wherein the first communication pin and the second communication pin of the USB socket are a USB_D+ pin and a USB_D− pin, respectively;

wherein a pin A6 of the USB-C plug is connected to the USB_D+ pin of the USB socket, a pin A7 of the USB-C plug is connected to the USB_D− pin of the USB socket, a pin B6 of the USB-C plug is connected to the right sounds channel signal pin of the headset socket, and a pin B7 of the USB-C plug is connected to the left sound channel signal pin of the headset socket; and the adapter is used for, when the adapter is inserted in the USB-C interface of the terminal device, transmitting a quick charging signal to the terminal device through the first communication pin and the second communication pin of the USB-C plug while receiving a sound channel signal from the terminal device through the first sound channel pin and the second sound channel pin of the USB-C plug;

wherein a charging power of the quick charging signal is greater than 10 watts (W); and wherein the terminal device is used for, when the adapter is inserted in the USB-C interface, simultaneously transmitting two paths of quick charging signals and two paths of sound channel signals through the first channel multiplexing pin, the second channel multiplexing pin, the third channel multiplexing pin and the fourth channel multiplexing pin of the USB-C interface.

11. The terminal device of claim 10, wherein the first multi-path converter is provided with a first switch control port and a first common terminal control port, and the second multi-path converter is provided with a second switch control port and a second common terminal control port; wherein the first switch control port is used for controlling the first switch to throw upward or throw downward according to a switch control signal outputted by an application processor module of the terminal device;

the second switch control port is used for controlling the second switch to throw upward or throw downward according to the switch control signal outputted by the application processor module of the terminal device;

the first common terminal control port is used for controlling two common ports of the first multi-path converter to connect and disconnect according to a common terminal control signal outputted by the application processor module of the terminal device; and the second common terminal control port is used for controlling two common ports of the second multi-path converter to connect and disconnect according to the common terminal control signal outputted by the application processor module of the terminal device, wherein the first switch and the second switch both are double-path single pole double throw switches.

12. The terminal device of claim 10, wherein when the adapter is positively inserted in the USB-C interface, the first switch of the first multi-path converter is thrown upward, the second switch of the second multi-path converter is thrown downward, and the first channel multiplexing pin, the second channel multiplexing pin, the third channel multiplexing pin and the fourth channel multiplexing pin of the USB-C interface are used for transmitting a first communication signal, a second communication signal, a right sound channel signal and a left sound channel signal in one-to-one correspondence; and when the adapter is reversely inserted in the USB-C interface, the first switch of the first multi-path converter is thrown downward, the second switch of the second multi-path converter is thrown upward, and the first channel multiplexing pin, the second channel multiplexing pin, the third channel multiplexing pin and the fourth channel multiplexing pin of the USB-C interface are used for transmitting the right sound channel signal, the left sound channel signal, the first communication signal and the second communication signal in one-to-one correspondence.

13. The terminal device of claim 12, wherein the CC controller module is used for, when a USB device is inserted in the USB-C interface, determining whether the USB device is the adapter.

14. The terminal device of claim 10, wherein in respond to determining that the adapter is positively inserted in the USB-C interface, a second CC port of the CC controller module is connected to a power pin of the USB-C plug; and in respond to determining that the adapter is reversely inserted in the USB-C interface, a first CC port of the CC controller module is connected to the power pin of the USB-C plug.

15. The terminal device of claim 10, wherein the CC controller module is further used for determining a state in which the headset plug is inserted in or unplugged from the headset socket in the adapter according to headset inserting information or headset unplugging information transmitted by a USB-C cable controller of the adapter through a CC bus.

16. The terminal device of claim 10, wherein the terminal device is further used for, when the adapter is inserted in the USB-C interface and a first CC port or a second CC port of the CC controller module detects a power resistor of a power pin of the USB-C plug of the adapter, transmitting a power voltage to the power pin through the first CC port or the second CC port of the CC controller module.

17. An adapter system, comprising an adapter and the terminal device of claim 10;

wherein a universal serial bus type-C (USB-C) plug cooperatively connected to a USB-C interface of a terminal device, a USB socket cooperatively connected to a charging plug, and a headset socket cooperatively connected to a headset plug; wherein a first communication pin of the USB-C plug is connected to a first communication pin of the USB socket, a second communication pin of the USB-C plug is connected to a second communication pin of the USB socket, and a first sound channel pin and a second sound channel pin of the USB-C plug are connected to a right sound channel signal pin and a left sound channel signal pin of the headset socket in one-to-one correspondence; wherein the first communication pin and the second communication pin of the USB-C plug are pings A6 and A7, respectively, and the first sound channel pin and the second channel pin of the USB-C plug are pins B6 and B7, respectively;

wherein the first communication pin and the second communication pin of the USB socket are a USB_D+ pin and a USB_D− pin, respectively;

wherein a pin A6 of the USB-C plug is connected to the USB_D+ pin of the USB socket, a pin A7 of the USB-C plug is connected to the USB_D− pin of the USB socket, a pin B6 of the USB-C plug is connected to the right sounds channel signal pin of the headset socket, and a pin B7 of the USB-C plug is connected to the left sound channel signal pin of the headset socket; and the adapter is used for, when the adapter is inserted in the USB-C interface of the terminal device, transmitting a quick charging signal to the terminal device through the first communication pin and the second communication pin of the USB-C plug while receiving a sound channel signal from the terminal device through the first sound channel pin and the second sound channel pin of the USB-C plug;

wherein a charging power of the quick charging signal is greater than 10 watts (w).

18. The adapter of claim 5, wherein when the adapter is positively inserted in the USB-C interface of the terminal device, the power pin of the USB-C plug is connected to the second CC port of the CC controller module in the terminal device; and when the adapter is reversely inserted in the USB-C interface of the terminal device, the power pin of the USB-C plug is connected to the first CC port of the CC controller module in the terminal device.

19. The terminal device of claim 11, wherein when the adapter is positively inserted in the USB-C interface, the first switch of the first multi-path converter is thrown upward, the second switch of the second multi-path converter is thrown downward, and the first channel multiplexing pin, the second channel multiplexing pin, the third channel multiplexing pin and the fourth channel multiplexing pin of the USB-C interface are used for transmitting a first communication signal, a second communication signal, a right sound channel signal and a left sound channel signal in one-to-one correspondence; and when the adapter is reversely inserted in the USB-C interface, the first switch of the first multi-path converter is thrown downward, the second switch of the second multi-path converter is thrown upward, and the first channel multiplexing pin, the second channel multiplexing pin, the third channel multiplexing pin and the fourth channel multiplexing pin of the USB-C interface are used for transmitting the right sound channel signal, the left sound channel signal, the first communication signal and the second communication signal in one-to-one correspondence.

20. The terminal device of claim 13, wherein in respond to determining that the adapter is positively inserted in the USB-C interface, a second CC port of the CC controller module is connected to a power pin of the USB-C plug; and in respond to determining that the adapter is reversely inserted in the USB-C interface, a first CC port of the CC controller module is connected to the power pin of the USB-C plug.

* * * * *

UNITED STATES PATENT AND TRADEMARK OFFICE

CERTIFICATE OF CORRECTION

PATENT NO. : 11,526,459 B2
APPLICATION NO. : 16/498779
DATED : December 13, 2022
INVENTOR(S) : Yixiang Jiang It is certified that error appears in the above-identified patent and that said Letters Patent is hereby corrected as shown below:

In the Specification

In Column 5, Line 9, delete “Mirco” and insert --Micro--.

In the Claims

In Column 19, Claim 1, Line 57, delete “pings” and insert --pins--.

In Column 19, Claim 1, Line 59, after “the second” insert --sound--.

In Column 20, Claim 1, Line 1, delete “sounds” and insert --sound--.

In Column 21, Claim 10, Line 64, delete “pings” and insert --pins--.

In Column 21, Claim 10, Line 66, after “the second” insert --sound--.

In Column 22, Claim 10, Line 8, delete “sounds” and insert --sound--.

In Column 23, Claim 17, Line 56, delete “pings” and insert --pins--.

In Column 23, Claim 17, Line 57, after “the second” insert --sound--.

In Column 24, Claim 17, Line 5, delete “sounds” and insert --sound--.

In Column 24, Claim 17, Line 18, delete “(w).” and insert --(W).--.

Signed and Sealed this
Twenty-third Day of May, 2023

Katherine Kelly Vidal
*Director of the United States Patent and Trademark Office*